US012718370B2

(12) United States Patent
Olson et al.

(10) Patent No.: US 12,718,370 B2
(45) Date of Patent: Aug. 25, 2026

(54) SYSTEM AND METHOD FOR QUALITY ASSURANCE OF PIXEL PIPELINE

(71) Applicant: Leica Biosystems Imaging, Inc., Vista, CA (US)

(72) Inventors: Allen Olson, San Diego, CA (US); Chris Camaratta, San Diego, CA (US)

(73) Assignee: Leica Biosystems Imaging, Inc., Vista, CA (US)

( * ) Notice: Subject to any disclaimer, the term of this patent is extended or adjusted under 35 U.S.C. 154(b) by 274 days.

(21) Appl. No.: 18/390,196

(22) Filed: Dec. 20, 2023

(65) Prior Publication Data

US 2024/0161299 A1 May 16, 2024

Related U.S. Application Data

(63) Continuation of application No. PCT/US2022/034032, filed on Jun. 17, 2022.

(60) Provisional application No. 63/215,299, filed on Jun. 25, 2021.

(51) Int. Cl.
*G06T 7/00* (2017.01)

(52) U.S. Cl.
CPC .. *G06T 7/0014* (2013.01); *G06T 2207/30004* (2013.01); *G06T 2207/30168* (2013.01)

(58) Field of Classification Search
CPC ......... G06T 7/0014; G06T 2207/30004; G06T 2207/30168; H04N 17/00; H04N 17/02; H04N 17/04
See application file for complete search history.

(56) References Cited

U.S. PATENT DOCUMENTS 6,490,696 B1 12/2002 Wood et al.
6,577,764 B2 * 6/2003 Myler .................. G06T 7/0004 375/240.27
7,092,008 B1 * 8/2006 Bernard ................ H04N 17/02 345/589
7,664,317 B1 * 2/2010 Sowerby ............... H04N 17/02 382/218
10,911,748 B1 * 2/2021 Molholm .............. H04N 17/04
(Continued)

FOREIGN PATENT DOCUMENTS

JP 2010-092234 A 4/2010

OTHER PUBLICATIONS

International Search Report and Written Opinion dated Oct. 20, 2022, for International Application No. PCT/US2022/034032, 10 pages.

*Primary Examiner* — John W Miller
(74) *Attorney, Agent, or Firm* — FBT Gibbons LLP

(57) ABSTRACT

Methods and systems method for determining quality of an image after a system configuration change. A method includes receiving an indication of a configuration update of an imaging system, processing a test image using the image display system to generate updated test image pixel data for display on the imaging system, determining if the updated test image pixel data is different than the ground truth pixel data of the test image by more than a quality threshold, and in response to the updated test image pixel data being different than the ground truth pixel data of the test image by more than the quality threshold, generate in indicator that the configuration change adversely affected the image generation properties of the imaging system.

18 Claims, 15 Drawing Sheets

(56) References Cited

U.S. PATENT DOCUMENTS

2009/0016579 A1* 1/2009 White .................... G16H 10/20 382/128
2009/0028232 A1* 1/2009 Baumgartner ....... H04N 17/004 375/228
2010/0027893 A1 2/2010 Hayber
2010/0195139 A1 8/2010 Fransazov et al.
2012/0127324 A1* 5/2012 Dickins .................. G09G 3/006 348/191
2014/0254897 A1* 9/2014 Ferguson ................ G06T 7/001 382/128
2016/0124619 A1* 5/2016 McCallum .......... G06F 3/04845 345/619
2016/0373829 A1* 12/2016 Ramnani ................ H04N 17/04
2018/0052120 A1* 2/2018 Murakami ............ G06T 11/001
2021/0233491 A1* 7/2021 Lee .......................... G09G 5/10
2023/0121265 A1* 4/2023 Nienstedt ............... G16H 40/40 705/2

* cited by examiner

SYSTEM AND METHOD FOR QUALITY ASSURANCE OF PIXEL PIPELINE

INCORPORATION BY REFERENCE TO PRIORITY APPLICATIONS

This application is a continuation of International Application No. PCT/US2022/034032, filed Jun. 17, 2022, entitled “System and Method for Quality Assurance of Pixel Pipeline,” which claims the benefit of U.S. Provisional Application No. 63/215,299, filed Jun. 25, 2021, which are incorporated by reference herein in [its] their entirety. Any and all applications for which a foreign or domestic priority claim is identified in the Application Data Sheet as filed with the present application are hereby incorporated by reference under 37 CFR 1.57 for all purposes and for all that they contain.

BACKGROUND

Technical Field

The described technology relates to ensuring the integrity of the pixel pipeline, and in particular, techniques for ensuring that software changes or updates to an image processing system do not affect the pixel pipeline for generating and/or displaying an image.

Description of the Related Technology

Tissue samples can be analyzed under a microscope for various diagnostic purposes, including detecting cancer by identifying structural abnormalities in the tissue sample. A tissue sample can be imaged to produce image data using a microscope or other optical system. The image data can be analyzed using image processing techniques as a part of diagnosing whether the image data is indicative of a disease present in the tissue sample. The image data is often analyzed visually, and the displayed appearance of the image can affect this analysis. Imaging systems that generate, process and display such images can use software and data that may be periodically updated by the providing vendor to improve the system functionality. However, changes to the software can affect the way an image is displayed and subsequently analyzed. Accordingly, it would be advantageous to be able to determine if a software update has affected the image display functionality of the imaging system.

SUMMARY

In systems that are used to display images for analysis by medical practitioners, it is important that images are displayed consistently such that features of a sample depicted in an image are displayed consistently. Unusual, uncommon, or inconsistent displaying of features an image may be attributed as a problem (or an artifact) with the associated sample, rather than a problem caused by the image chain, which can lead to confusing and inconsistent interpretation of images by the medical practitioner. The “image chain” as used herein, is a broad phrase that generally refers to functionality (e.g., hardware or software) that is used to process an image for display, prior to the image being displayed. The methods and techniques described herein relate to determining if a configuration change occurring on a display device affects the way the display device generates and displays an image. The configuration change could be, in some embodiments, new software or a change (update) of any software on the system. In an example, the configuration change can relate to image compression software that used to compress images for storing on a computer readable medium. In another example, the configuration change can relate to communication software that retrieves a stored image and/or communicates the retrieved image to another processing system. In another example, the configuration change can relate to a web browser that is run on a display device and used to access an image stored on a server system, either locally or remotely. In another example, the configuration change can relate to a web browser that is run on a display device that receives an image and provides the image to a display. In another example, the configuration change can relate to display software that is used to process an image prior to the image being displayed, for example, software to render and/or display an image. In another example, the configuration change can relate to software or information (e.g., lookup tables or other data files) that is used to determine the color, brightness, contrast, dynamic range, or any other characteristic of an image. Although a configuration change can relate to changes to one or more hardware components, generally the configuration change that can be at issue relate to software changes (e.g., software updates) because they generally occur much more frequently, and may be done automatically (e.g., overnight) or with minimal if any supervision of the installation, and/or with minimal testing of the system after the configuration update is complete.

One innovation includes an apparatus for determining quality of an image displayed on a display device. In an example, the apparatus can include a hardware memory configured to store executable instructions, and a hardware processor in communication with the hardware memory, wherein the executable instructions. When executed by the processor, the executable instructions configure the processor to determine that a configuration change has occurred at the display device, provide a test image to the display device, receive test image display data from the display device, the test image pixel data generated by a processor of the display device by processing the test image, determine if the test image display data is different than a reference test image by more than a quality threshold, and in response to determining that the test image display data is different than the reference test image by more than a quality threshold, generate an indicator that the configuration change affects functionality of the display device.

Other examples of such an apparatus can include one or more other features. In some embodiments, the reference test image is representative of the test image processed by the display device prior to the configuration change. In some embodiments, the reference test image is representative of expected test image display data, of the test image, generated by the display device. In some embodiments, the processor is configured to determine if the test image display data is different than a reference test image by more than a quality threshold by comparing corresponding pixel values in the test image display data and the reference test image. In some embodiments, the executable instructions, when executed by the processor, further configure the processor to, in response to determining a configuration change has occurred: determine if there is a change in communication signals between the apparatus and the display device, and if there is a change in the communication signals between the apparatus and the display device, generate a notification that the configuration change affects communications with the display device. In some embodiments, the executable instructions, when executed by the processor, further configure the processor to, in response to determining a configuration change has occurred: determine if there is a change in control codes that are used to initiate rendering images on the display device, and if there is a change in the control codes that are used to initiate rendering images on the display device, generate a notification that the configuration change affects the control codes. In some embodiments, the processor is configured to determine if the test image display data is different than a reference test image by more than the quality threshold by determining the number of pixels in the test image display data that are different than the reference test image. In some embodiments, the quality control threshold is a predetermined number of pixels, and wherein the processor is configured to determine if the test image data is different than the reference image data by more than a quality threshold by determining if a number of pixels in the test image display data that are different than the corresponding pixels in the reference test image is greater than the predetermined number of pixels. In some embodiments, the quality control threshold is a predetermined percentage of pixels, and wherein the processor is configured to determine if the test image data is different than the reference image data by more than a quality threshold by determining if a number of pixels in the test image display data that are different than the corresponding pixels in the reference test image is greater than the predetermined percentage of pixels. In some embodiments, the quality control threshold is a predetermined value, and wherein the processor is configured to determine if the test image data is different than the reference image data by more than a quality threshold by determining if a sum of the differences of values of the pixels in the test image display data and values of corresponding pixels in reference test image is greater than the predetermined value. In some embodiments, the apparatus further comprises a display, where the executable instructions, when executed by the processor, further configure the processor to, in response to determining a configuration change has occurred, display the notification on the display. In some embodiments, the executable instructions, when executed by the processor, further configure the processor to, in response to determining a configuration change has occurred, transmit notification information to the display device for displaying the notification on the display device. In some embodiments, the quality threshold is a value that if exceeded, is indicative that the test image display data has a different contrast than the reference test image. In some embodiments, the quality threshold is a value that if exceeded, is indicative that the test image display data has a different brightness than the reference test image. In some embodiments, the quality threshold is a value that if exceeded, is indicative that the test image display data has a different dynamic range than the reference test image. In some embodiments, the quality threshold is a value that if exceeded, is indicative that the test image display data has one or more different image characteristics than the reference test image.

Another innovation is a non-transitory computer readable medium for determining quality of an image displayed on a display device, the computer readable medium having program instructions for causing a hardware processor to perform a method of determining that a configuration change has occurred at the display device, providing a test image to the display device, receiving test image display data from the display device, the test image pixel data generated by a processor of the display device by processing the test image, determining if the test image display data is different than a reference test image by more than a quality threshold, and in response to determining that the test image display data is different than the reference test image by more than a quality threshold, generating an indicator that the configuration change affects functionality of the display device.

Other examples of a non-transitory computer readable medium for determining quality of an image displayed on a display device can include one or more other features. In some embodiments, the reference test image is representative of the test image processed by the display device prior to the configuration change. In some embodiments, the reference test image is representative of expected test image display data, of the test image, generated by the display device. In some embodiments, the method further comprises determining if the test image display data is different than a reference test image by more than a quality threshold by comparing corresponding pixel values in the test image display data and the reference test image. In some embodiments, the method further comprises determining if there is a change in communication signals between the apparatus and the display device, and if there is a change in the communication signals between the apparatus and the display device, generating a notification that the configuration change affects communications with the display device. In some embodiments, the method further comprises determining if there is a change in control codes that are used to initiate rendering images on the display device, and if there is a change in the control codes that are used to initiate rendering images on the display device, generate a notification that the configuration change affects the control codes. In some embodiments, the method further comprises determining if the test image display data is different than a reference test image by more than a quality threshold by determining the number of pixels in the test image display data that are different than the reference test image. In some embodiments, the quality control threshold is a predetermined number of pixels, and wherein the method determines if the test image data is different than the reference image data by more than a quality threshold by determining if the number of pixels in the test image display data that are different than the corresponding pixels in the reference test image is greater than the predetermined number of pixels. In some embodiments, the quality control threshold is a predetermined percentage of pixels, and wherein the method determines if the test image data is different than the reference image data by more than a quality threshold by determining if the number of pixels in the test image display data that are different than the corresponding pixels in the reference test image is greater than the predetermined percentage of pixels. In some embodiments, the quality control threshold is a predetermined value, and wherein the method determines if the test image data is different than the reference image data by more than a quality threshold by determining if the sum of the differences of values of the pixels in the test image display data and values of corresponding pixels in reference test image is greater than the predetermined value. In some embodiments, the method further comprises, in response to determining a configuration change has occurred, displaying the notification on a display of the apparatus. In some embodiments, the method further comprises, in response to determining a configuration change has occurred, displaying the notification on a display of the display device. In some embodiments, the quality threshold is a value that if exceeded, is indicative that the test image display data has a different contrast than the reference test image. In some embodiments, the quality threshold is a value that if exceeded, is indicative that the test image display data has a different brightness than the reference test image. In some embodiments, the quality threshold is a value that if exceeded, is indicative that the test image display data has a different dynamic range than the reference test image. In some embodiments, the quality threshold is a value that if exceeded, is indicative that the test image display data has one or more different image characteristics than the reference test image.

Another innovation includes a method for determining quality of an image displayed on a display device, the method comprising: determining that a configuration change has occurred at the display device, providing a test image to the display device, receiving test image display data from the display device, the test image pixel data generated by a processor of the display device by processing the test image, determining if the test image display data is different than a reference test image by more than a quality threshold, and in response to determining that the test image display data is different than the reference test image by more than a quality threshold, generating an indicator that the configuration change affects functionality of the display device. Such methods can include one or more features. For example, features that are described above in reference to the apparatus or the computer readable medium, or other features disclosed herein.

BRIEF DESCRIPTION OF THE DRAWINGS

The features and advantages of the multi-stage stop devices, systems, and methods described herein will become more fully apparent from the following description and appended claims, taken in conjunction with the accompanying drawings. These drawings depict only several embodiments in accordance with the disclosure and are not to be considered limiting of its scope. In the drawings, similar reference numbers or symbols typically identify similar components, unless context dictates otherwise. The drawings may not be drawn to scale.

DETAILED DESCRIPTION

Certain features disclosed herein relate to checking quality of a test image processed for display, against a previously stored test image to ensure integrity of one or more displayed image parameters. For example, one or more of color, brightness, contrast, dynamic range, sharpness, etc. In one example, a process relating to checking image quality can occur based on an input from a user who wants to check the image quality of the system. In another example, a process relating to checking image quality can occur when the system receives an indication of a change in image processing and/or display functionality for a display device that is used to display images. In an example, the images are images generated from scanning a sample (or specimen), for example, whole slide images (WSI's).

A process can be executed on an image display system to evaluate an update or change (bother referred to herein as an "update" for ease of reference), to software, firmware and/or hardware that is used to store, retrieve, communicate, render, and/or display an image on a display device. Such updates can include new software, new firmware, new hardware, or configuration changes, including software or information that is automatically downloaded and installed, or manually downloaded and installed on the image display system or on a display device. Such a process can be run by a hardware processor (or controller) on an apparatus that is in communication with one or more display devices and that provides images to the one or more display devices. For example, as illustrated by an image display system 600 that includes apparatus 605 and display devices 620 shown FIG. 6A. Examples of such processes are illustrated in (and described in reference to) FIG. 7A, FIG. 7B, and FIG. 7C. The display device 620 can be a type of computer is in communication with the apparatus, for example, a laptop computer, a tablet computer, a desktop computer, a smart phone, or any other computer that can communicate with the apparatus and includes a display (i.e., a display screen) for displaying an image to a user. In some examples, the apparatus 605 may be referred to as a server system.

Figure 6A:
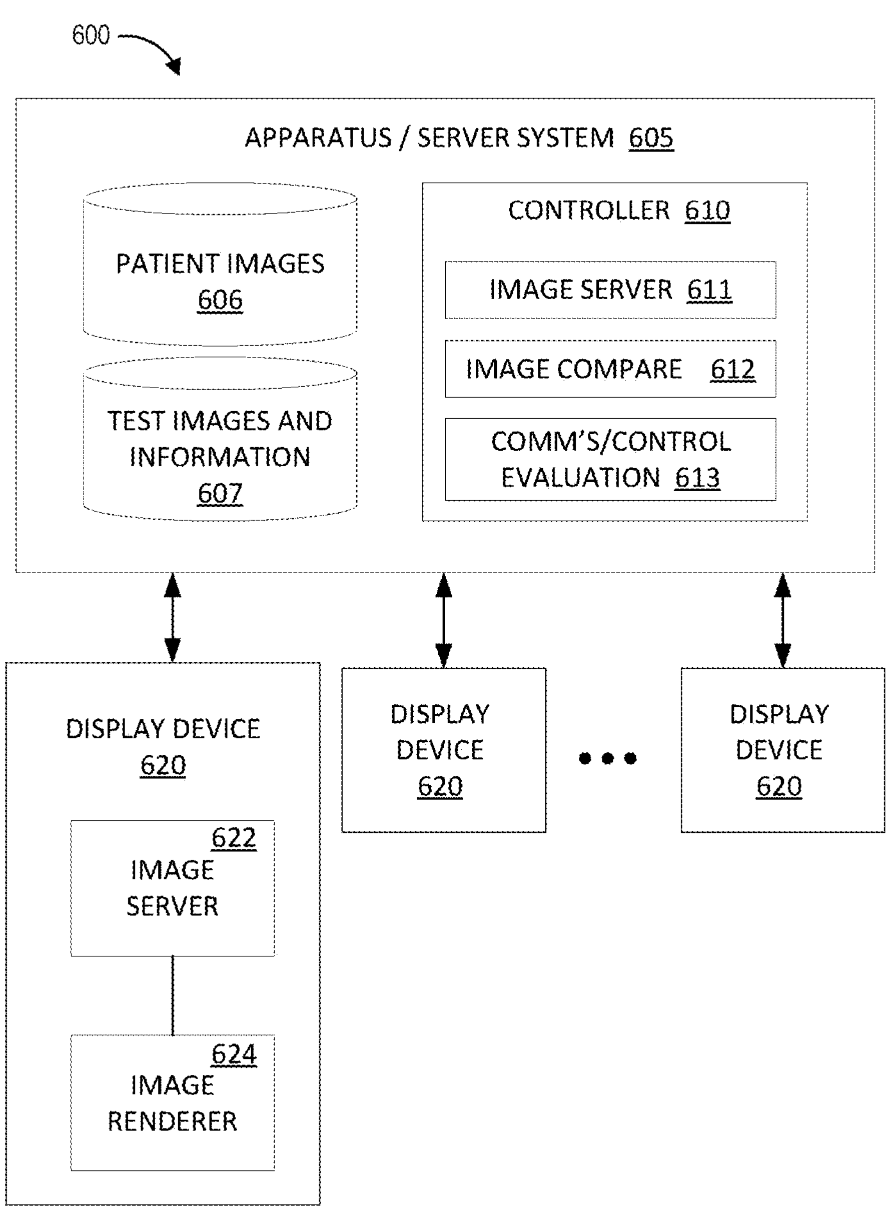
FIG. 6A is an example block diagram of a system for assessing quality of software to determine if the update affected how a sample is displayed.

A process to determine if an update to a display device affected the functionality of the display device may begin when the apparatus receives an indication that an update has occurred on the display device. Such a process can be running in the background on the image display system, for example, on the apparatus 605 or on the display device 620 (FIG. 6A). In some embodiments, the process is running on a separate system that monitors communications/downloads to the apparatus 606 or display device 620. In some examples, the process to determine if an update to a display device affected the functionality of the display device may be started based on the system detecting that an update has occurred. In an implementation, the apparatus may receive an indication that an update has occurred on the display device when the display device connects to the apparatus. For example, the apparatus can have information on the configuration of each display device, and when a display device connects to the apparatus the configuration of the display device is checked to see if a change has occurred. In another example, when the display device connects the apparatus, the display device provides an indication to the apparatus the configuration change is occurred since last time the display devices connected to the apparatus.

Once the apparatus determines an update has occurred on the display device, the apparatus can check functionality associated with a display device to determine if the update has affected certain functionality of the display device that is used to properly display images provided by the apparatus to the display device. For example, the apparatus can be configured to determine if communications with a display device have been affected by the update by sending various communications to the display device checking for correct responses from the display device, and if error codes occur during the communications. The apparatus can also be configured to determine if the update has affected functionality of the display device that is used to display images on the display device. For example, the apparatus can provide display device certain control signals that are used to display images and monitor the communications from the display device to see if the control signals generate error codes.

The apparatus can be configured to determine if the update has affected how the display device displays images provided to the display device from the apparatus. In an example, the apparatus first determines a configuration change occurred on a display device (e.g., by checking information about the configuration of the display device display device connects to the apparatus). In response to determining the configuration change has occurred on the display device, the apparatus can retrieve a known previously stored test image and provide the test image to the display device. The display device can process the test image using functionality that has been updated on the display device, and generate pixel data depicting the test image for display on the display device. The generated pixel data (that is, the data that would normally be sent to the display screen) may be transmitted to the apparatus for evaluation instead of being displayed, or in addition to being displayed. In some examples, the display device generates pixel data (pixel data representing the data that will be displayed on the display device) from the test image using one or more hardware processors on the display device, and instead of displaying the pixel data this data is sent to the apparatus for evaluation.

The apparatus can receive the pixel data (sometimes referred to herein as "test image display data") from the display device and compares it to a reference test image to determine if the test image display data is different than the reference test image. This comparison can be a comparison of corresponding pixels in the test image display data and pixels in the reference test image.

If the differences between the test image display data reference test image are greater than a threshold value, the apparatus can generate a notification (e.g., an alert, email message, text message, other electronic message, a displayable message or indication, etc.) indicating image display functionality relating to the display device has been affected by the configuration change. In some embodiments, the notification can be displayed on the apparatus. In some embodiments, such a notification can be transmitted to the display device and displayed on the display device. In some embodiments, such a notification can be transmitted to another device, or a particular user to notify them that the configuration change of the display device affects the image display functionality of the display device.

Upon seeing the notification, a user can review this issue further and decide to, for example, remove the configuration update or to otherwise address this issue. In one process, an update is made to one display device in the apparatus determines if the update changed the image display functionality of the display device. If the image display functionality is not adversely affected by the update, the update can be approved in similar updates can be made on other systems. If the image display functionality is adversely affected, the update can be rejected and feedback can be provided to the entity that provided the update.

As used herein, the phrase "image chain" or "pixel pipeline" refers to a portion of, or the entirety of, any software, hardware, firmware, lookup tables, data, or information (referred to collectively as imaging functionality") that is used to generate, process and/or display an image. Accordingly, one purpose of certain embodiments described herein is to verify that new or updated software that is provided to a display device (for example, automatic web browser updates, or other software updates) do not change the image chain or any communications or controls between in image display device and apparatus providing images to the image display device, which introduce risk for utilizing a display device for primary diagnosis by a pathologist for review and interpretation of digital images of surgical pathology slides prepared from specimens or tissue (e.g., formalin-fixed, paraffin-embedded (FFPE) tissue).

As an illustrative example, the web browser that is being used to display an image on the display device can be an Aperio WebViewer DX (web browser), and certain functionality is described in reference to the Aperio WebViewer DX. In other embodiments, similar functionality can be implemented for other web browsers. In some embodiments, the Aperio WebViewer DX can be configured to employ multiple levels of risk mitigation controls to minimize any potential risks of impacting the WSI data rendering and display function due to browser updates.

Detection: As an example, the Aperio WebViewer DX can include functionality to automatically detect and notify a user if a current version (configuration) has changed from the last version, for example, from the last time the display device connected to the apparatus/server system ("system"). Upon launching Aperio WebViewer DX from a web browser, a sequence of operations can take place to pull client specifications from the display system. This client information can be combined to create information (referred to herein a "fingerprint") for the current runtime environment that can be compared against a database of previously tested fingerprints. If the fingerprint of the web browser/display system does not match any preexisting entry in the database, an application can proceed to notify the user that a change has occurred, and initiate running tests to determine if the change affects the quality of a displayed image.

Abstraction: Aperio WebViewer DX be configured to remove dependencies on the web browser for the image rendering pipeline. This is achieved by controlling the image rendering pipeline via server-side controls and leveraging the standards-based WebGL protocol. In an example, color accuracy is preserved via a server-side control when the image server converts the color profile to sRGB. WebGL code is delivered to the client during runtime and executes outside of the browser, therefore browser updates have a low risk of impacting the behavior defined by this code. The code is processed directly on the operating system's underlying OpenGL driver, which executes it on the GPU; the browser is only responsible for compiling the code. The browser is also responsible for executing the JavaScript control code that enables the primary workflow.

Verification: Upon detection of a browser update, the Aperio WebViewer DX can be configured to automatically execute a series of built-in tests to qualify that the image rendering pipeline has not been impacted. The test coverage for the built-in test is intended to cover the operations in the rendering pipeline that are at highest risk due to web browser updates.

In some embodiments, tests cover two main operations: a) pixel to pixel comparison of a greyscale image and b) color validation of a color target. The following information in Table 1 (below) provides a specific example of the software operations for the built-in tests.

TABLE 1

| STEP | ACTION | ACCEPTANCE CRITERIA |
|---|---|---|
| 1 | Collect browser fingerprint and compare against verified versions | If already tested, stop If not, continue |
| 2 | Request the TG18-QC image greyscale test image from server as PNG (lossless) and render it to screen in the WebViewer This step Verifies the following: Exchange of static code to client is not impacted Execution of static control code is not impacted Copy operations and pass through to from GPU pipeline to Browser renderer is not impacted Compilation of static shader GPU code does not cause errors | Image data received and rendered |
| 3 | Capture the image buffer in the GPU prior to being sent to the browser and upload the image buffer back to the server | Image successfully uploaded |

TABLE 1-continued

| STEP | ACTION | ACCEPTANCE CRITERIA |
|---|---|---|
| 4 | Perform Pixel to pixel comparison of ground truth image against pixel values rendered by the browser This test step verifies the following: Exchange of image data and copy operations to GPU imaging pipeline is not impacted Compilation of static shader GPU code is not impacted Luminosity remains unchanged in rendered image color drive levels remain unchanged in rendered image brightness/contrast remain unchanged in rendered image registration/scaling/skew was not introduced to rendered image Ringing was not introduced to rendered image Contouring remains unchanged in the rendered image Posterization was not introduced into image Aliasing was not introduced into image Sub-image artifacts were not introduced into the rendered image | Pixel data between two images are identical across the entire image |
| 5 | Request the XRite Color Checker target from the server as BMP (lossless) and render it in WebViewer. Capture the image buffer at the end of the image rendering pipeline prior to being sent to the display adaptor and upload the image buffer back to the server | Image data received and rendered. Image successfully uploaded. |
| 6 | Perform Pixel to pixel comparison of ground truth image against pixel values rendered by the browser This test step verifies the following: Luminosity remains unchanged in rendered image Color drive levels remain unchanged in rendered Image Brightness/contrast remain unchanged in rendered image | Pixel data between two images are identical across the entire image |

Visual Validation

Upon completing the automated tests, the WebViewer DX can be configured to present the results to the user and request the user to manually complete a visual inspection process to validate the application continues to be suitable for its intended use. The intent of the visual validation is to qualify that the rendered data outputs correctly from the browser's canvas to the screen. Although the actual image data is unlikely to be altered at this step in the rendering pipeline, the greyscale TG18-QC image provides a method to ensure the image data is correctly represented on the screen. The following information in Table 2 (below) provides a more detailed summary validation test.

TABLE 2

| Test Area | Test Verifies the browser does not perform additional transformations: |
|---|---|
| 1 | RGB color shift Pixel RGB Bit depth Calibrated gray level |
| 2 | Spatial resolution Luminance patches Display uniformity Display contrast |

TABLE 2-continued

| Test Area | Test Verifies the browser does not perform additional transformations: |
|---|---|
| 3 | Display sharpness<br>Display luminance |

A test image target can be displayed and visually evaluated. For example, the test image target illustrated in FIG. 11 can be displayed and evaluated. In some embodiments, the test image targe includes the following items are visually checked by a user:

| TEST GRAPHIC AREA | WHAT TO CHECK FOR: |
|---|---|
| 1. Vertical gradient bars outlined in Blue | *Changes in intensity are smooth and uniform over the entire range of bright to dark<br>*There are no noticeable bands of constant intensity (solid white, gray, or black) inside or near edges of the bars |
| 2. Upside down U-shape outlined in Yellow | *Following the direction of the yellow arrows in the example (from white to black), the change in intensity from one square patch to the next increases by the same relative amount |
| 3. Squares outlined in Green | *The small 95% grayscale square patch inside the black square is clearly visible at normal viewing distance (30-60 cm) |

Other features of systems and methods for an image analysis system (or "system") are described herein. Generally, these features relate to functionality that is used to analyze samples that are displayed on a display of the image analysis system. In one example, the features are related to a movable, rotatable, and adjustable scale they can be overlaid on a whole slide image (WSI) of a tissue sample ("sample"). In another example, the features are related to color coding of magnification levels buttons, or icons, that can be selected on the display where the color coding magnification levels match those in the standard microscope. In another example, the features relate to generating a specialized report by a pathologist containing notes, annotations, and images selected from the displayed WSI and its corresponding notes and annotations.

The illustrated embodiments described herein are provided by way of illustration and are not meant to be limiting. Other embodiments can be utilized, and other changes can be made, without departing from the spirit or scope of the subject matter presented. It will be readily understood that the aspects and features of the present disclosure described below and illustrated in the figures can be arranged, substituted, combined, and designed in a wide variety of different configurations by a person of ordinary skill in the art, all of which are made part of this disclosure.

System Overview

Figure 1:
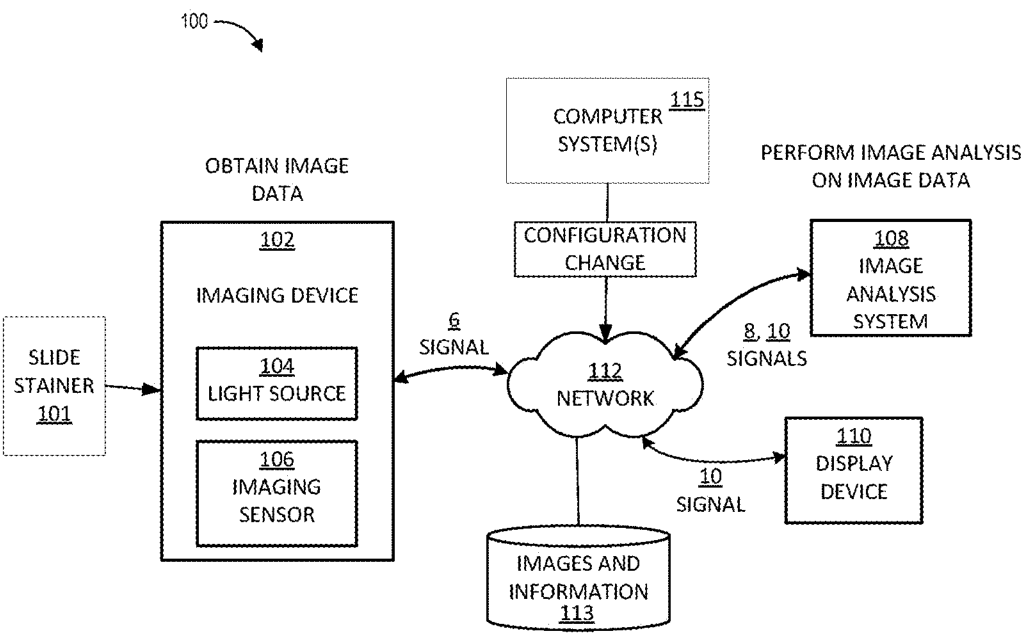
FIG. 1 illustrates an example environment in which a user and/or the multispectral imaging system may implement an image analysis system according to some embodiments.

FIG. 1 illustrates an example environment 100 in which a user and/or an imaging system may analyze a tissue sample. The environment 100 includes an automated slide stainer 101 that is controlled to produce consistently stained slides based on one or more protocols. The environment 100 can also include an imaging device 102 that generates a digital representation of a stained slide. In some embodiments, the environment 100 includes a multi-color (or broad spectrum) imaging device 102. The imaging device 102 can be one or more of a camera, a scanner, a medical imaging device, a microscope, etc. Further, the imaging device 102 can use imaging technologies such as X-ray radiography, magnetic resonance imaging, ultrasound, endoscopy, elastography, tactile imaging, thermography, medical photography, nuclear medicine functional imaging, positron emission tomography, single-photon emission computed tomography, etc. that includes an imaging sensor 106 corresponding to the imaging technology employed. For example, the imaging device can be a magnetic resonance imaging ("MRI") scanner, a positron emission tomography ("PET") scanner, an ultrasound imaging device, an x-ray imaging device, a computerized tomography ("CT") scanner. The digital representation may be referred to herein as an "image" and can be presented on a computer display device 110 for evaluation by a user. Although referred to as an image, the digital representation is a set of data which can be analyzed by computer processes, for example, for object (e.g., marker) identification, characterization, quantification, and/or spatial analysis of identified objects, etc. In some examples, an image can be used as training data for a machine learning process, and/or processed by a machine learning process to determine information from the image. The digital representation can be communicated as signal 6 to a network 112 and then communicated as a signal 8 to an image analysis system 108 for processing (e.g., feature detection, feature measurements, etc.). The image analysis system 108 may perform image analysis on received image data. The image analysis system 108 can normalize the image data obtained using color-stained images for input to a machine learning algorithm, which may determine characteristics of the image. The image analysis system may register and/or transform an image to align an image with other related images to facilitate analysis of information in the related images. Results from the image analysis system 108 can be communicated as a signal 10 to one or more display devices 110 (which also may be referred to herein as a "display device" or a "client device").

In some implementations, the imaging device 102 includes a light source 104 configured to emit multispectral light onto the tissue sample(s) and the image sensor 106 configured to detect light (e.g., multispectral light) emitted from, or passing through, the tissue sample. Multispectral imaging using the light source 104 can involve providing light to the tissue sample carried by a carrier within a range of frequencies. That is, the light source 104 may be configured to generate light across a spectrum of frequencies to provide multispectral imaging.

In some implementations, the imaging device 102 includes a light source 104 configured to emit light onto or through the tissue sample. In an example, the light source can be a broad-spectrum white light source emitting light across a spectrum of wavelengths. In another example, the light source can emit light across a particular range of one or more wavelengths. In some embodiments, the light source 104 is configured to provide a "brightfield" emitting light through the sample. In some embodiments, the light source 102 is configured to provide light of wavelengths that causes fluorescence of material (e.g., markers, objects) in the tissue sample. The imaging device 102 includes one or more imaging sensor 106 configured to detect light emitted from, or transmitted through, the tissue sample, based on the implementation. Embodiments of imaging using the light source 104 can involve providing light to the tissue sample within a range of frequencies.

In certain embodiments, the stained tissue sample may reflect light, or through fluorescence, emit light received from the light source 104, which can then be detected at the image sensor 106. In these implementations, the light source 142 and the image sensor 106 may be located on substantially the same side of the tissue sample. In other implementations, the light source 104 and the image sensor 106 may be located on opposite sides of the tissue sample. The image sensor 106 may be further configured to generate image data based on the broad-spectrum light detected at the image sensor 106. In certain implementations, the image sensor 106 may include a high-resolution sensor configured to generate a high-resolution image of the tissue sample. The high-resolution image may be generated based on excitation of the stained tissue sample in response to light provided onto the sample at different frequencies (e.g., a frequency spectrum) or different wavelengths. For example, fluorescence microscopy uses intense, near-monochromatic illumination. In some embodiments, light is provided by one or more xenon arc lamps or mercury-vapor lamps with an excitation filter, a laser, a supercontinuum source, and/or a high-power LED.

The imaging device 102 may capture and/or generate image data for analysis. The imaging device 102 may include one or more of a lens, an image sensor, a processor, or memory. The imaging device 102 may receive a user interaction. The user interaction may be a request to capture image data. Based on the user interaction, the imaging device 102 may capture image data. In some embodiments, the imaging device 102 may capture image data periodically (e.g., every 10, 20, or 30 minutes). In other embodiments, the imaging device 102 may determine that an item has been placed in view of the imaging device 102 (e.g., a histological sample has been placed on a table and/or platform associated with the imaging device 102) and, based on this determination, capture image data corresponding to the item. The imaging device 102 may further receive image data from additional imaging devices. For example, the imaging device 102 may be a node that routes image data from other imaging devices to the image analysis system 108. In some embodiments, the imaging device 102 may be located within the image analysis system 108. For example, the imaging device 102 may be a component of the image analysis system 108.

Further, the image analysis system 108 may perform an imaging function. In other embodiments, the imaging device 102 and the image analysis system 108 may be connected (e.g., wirelessly or wired connection). For example, the imaging device 102 and the image analysis system 108 may communicate over a network 112. Further, the imaging device 102 and the image analysis system 108 may communicate over a wired connection. In one embodiment, the image analysis system 108 may include a docking station that enables the imaging device 102 to dock with the image analysis system 108. An electrical contact of the image analysis system 108 may connect with an electrical contact of the imaging device 102. The image analysis system 108 may be configured to determine when the imaging device 102 has been connected with the image analysis system 108 based at least in part on the electrical contacts of the image analysis system 108. In some embodiments, the image analysis system 108 may use one or more other sensors (e.g., a proximity sensor) to determine that an imaging device 102 has been connected to the image analysis system 108. In some embodiments, the image analysis system 108 may be connected to (via a wired or a wireless connection) a plurality of imaging devices. The image analysis system 108 may include various components for providing the features described herein. In some embodiments, the image analysis system 108 may include one or more image analysis modules to perform the image analysis of the image data received from the imaging device 102. The image analysis modules may perform one or more imaging algorithms using the image data.

The image analysis system 108 may be connected to one or more display device 110. The image analysis system 108 may be connected (via a wireless or wired connection) to the display device 110 to provide a recommendation for a set of image data. The image analysis system 108 may transmit the recommendation to the display device 110 via the network 112. In some embodiments, the image analysis system 108 and the user computing device 110 may be configured for connection such that the user computing device 110 can engage and disengage with image analysis system 108 in order to receive the recommendation. For example, the display device 110 may engage with the image analysis system 108 upon determining that the image analysis system 108 has generated a recommendation for the display device 110. Further, a particular display devices 110 may connect to the image analysis system 108 based on the image analysis system 108 performing image analysis on image data that corresponds to the particular user computing device 110. For example, a user may be associated with a plurality of histological samples. Upon determining, that a particular histological sample is associated with a particular user and a corresponding display device 110, the image analysis system 108 can transmit a recommendation for the histological sample to the particular display device 110. In some embodiments, the display device 110 may dock with the image analysis system 108 in order to receive the recommendation.

In some implementations, the imaging device 102, the image analysis system 108, and/or the display device 110 may be in wireless communication. For example, the imaging device 102, the image analysis system 108, and/or the display device 110 may communicate over a network 112. The network 112 may include any viable communication technology, such as wired and/or wireless modalities and/or technologies. The network may include any combination of Personal Area Networks ("PANs"), Local Area Networks ("LANs"), Campus Area Networks ("CANs"), Metropolitan Area Networks ("MANs"), extranets, intranets, the Internet, short-range wireless communication networks (e.g., ZigBee, Bluetooth, etc.), Wide Area Networks ("WANs")—both centralized and/or distributed—and/or any combination, permutation, and/or aggregation thereof. The network 112 may include, and/or may or may not have access to and/or from, the internet. The imaging device 102 and the image analysis system 108 may communicate image data. For example, the imaging device 102 may communicate image data associated with a histological sample to the image analysis system 108 via the network 112 for analysis. The image analysis system 108 and the display device 110 may communicate a recommendation corresponding to the image data. For example, the image analysis system 108 may communicate a diagnosis regarding whether the image data is indicative of a disease present in the tissue sample. In some embodiments, the imaging device 102 and the image analysis system 108 may communicate via a first network and the image analysis system 108 and the display device 110 may communicate via a second network. In other embodiments, the imaging device 102, the image analysis system 108, and the display device 110 may communicate over the same network.

One or more third-party computer systems 115 ("computer system 115") may communicate with the imaging device 102, the image analysis system 108, and/or the display device 110. In some embodiments, the computer system 115 may communicate directly with the imaging device 102, the image analysis system 108, and/or the display device 110 directly or via the network 112.

The computer system 115 can provide information to change functionality on the imaging device 102, the image analysis system 108, and/or the display device 110, or even the network 112. For example, the information may be new software, a software update, new or revised lookup tables, or data or any other type of information that is used in any way to generate, manipulate, transfer or render an image (all being referred to herein as an "update" for ease of reference). The update may be related to, for example, image compression, image transfer, image storage, image display, image rendering, etc. The computer system 115 may provide a message to the device or system to be updated, or may provide a message to a user who interacts with the system control updating the system. In some embodiments, the computer system 115 provides an update automatically, e.g., periodically or as needed/available. In some embodiments, the computer system 105 may provide an update in response to receiving an indication from a user provide the update (e.g., affirmation for the update or a request for the update). As discussed hereinbelow in reference to FIGS. 6, 7A, 7B, and 7C, once an update has been made the system can perform quality check to determine if the update change the way images are displayed (e.g., color of tissue samples). If the update has changed the way images are displayed such that the change is greater than the quality threshold, the system can generate a message to alert the user to update as degraded or changed the image display quality.

With reference to an illustrative embodiment, the imaging device 102 can obtain block data. In order to obtain the block data, the imaging device 102 can image (e.g., scan, capture, record, etc.) a tissue block. The tissue block may be a histological sample. For example, the tissue block may be a block of biological tissue that has been removed and prepared for analysis. As will be discussed in further below, in order to prepare the tissue block for analysis, various histological techniques may be performed on the tissue block. The imaging device 102 can capture an image of the tissue block and store corresponding block data in the imaging device 102. The imaging device 102 may obtain the block data based on a user interaction. For example, a user may provide an input through a user interface (e.g., a graphical user interface ("GUI")) and request that the imaging device 102 image the tissue block. Further, the user can interact with imaging device 102 to cause the imaging device 102 to image the tissue block. For example, the user can toggle a switch of the imaging device 102, push a button of the imaging device 102, provide a voice command to the imaging device 102, or otherwise interact with the imaging device 102 to cause the imaging device 102 to image the tissue block. In some embodiments, the imaging device 102 may image the tissue block based on detecting, by the imaging device 102, that a tissue block has been placed in a viewport of the imaging device 102. For example, the imaging device 102 may determine that a tissue block has been placed on a viewport of the imaging device 102 and, based on this determination, image the tissue block.

The imaging device 102 can obtain slice data. In some embodiments, the imaging device 102 can obtain the slice data and the block data. In other embodiments, a first imaging device can obtain the slice and a second imaging device can obtain the block data. In order to obtain the slice data, the imaging device 102 can image (e.g., scan, capture, record, etc.) a slice of the tissue block. The slice of the tissue block may be a slice of the histological sample. For example, the tissue block may be sliced (e.g., sectioned) in order to generate one or more slices of the tissue block. In some embodiments, a portion of the tissue block may be sliced to generate a slice of the tissue block such that a first portion of the tissue block corresponds to the tissue block imaged to obtain the block data and a second portion of the tissue block corresponds to the slice of the tissue block imaged to obtain the slice data. As will be discussed in further detail below, various histological techniques may be performed on the tissue block in order to generate the slice of the tissue block. The imaging device 102 can capture an image of the slice and store corresponding slice data in the imaging device 102. The imaging device 102 may obtain the slice data based on a user interaction. For example, a user may provide an input through a user interface and request that the imaging device 102 image the slice. Further, the user can interact with imaging device 102 to cause the imaging device 102 to image the slice. In some embodiments, the imaging device 102 may image the tissue block based on detecting, by the imaging device 102, that the tissue block has been sliced or that a slice has been placed in a viewport of the imaging device 102.

The imaging device 102 can transmit a signal 8 to the image analysis system 108 representing the captured image data (e.g., the block data and the slice data). The imaging device 102 can send the captured image data as an electronic signal 6 to the image analysis system 108 via the network 112. The signals 6, 8 may include and/or correspond to a pixel representation of the block data and/or the slice data. It will be understood that the signal can include and/or correspond to more, less, or different image data. For example, the signal may correspond to multiple slices of a tissue block and may represent a first slice data and a second slice data. Further, the signals 6, 8 may enable the image analysis system 108 to reconstruct the block data and/or the slice data. In some embodiments, the imaging device 102 can transmit a first signal corresponding to the block data and a second signal corresponding to the slice data. In other embodiments, a first imaging device can transmit a signal corresponding to the block data and a second imaging device can transmit a signal corresponding to the slice data.

The image analysis system 108 can perform image analysis on the block data and the slice data provided by the imaging device 102. In order to perform the image analysis, the image analysis system 108 may utilize one or more image analysis modules that can perform one or more image processing functions. For example, the image analysis module may include an imaging algorithm, a machine learning model, a convolutional neural network, or any other modules for performing the image processing functions. Based on performing the image processing functions, the image analysis module can determine a likelihood that the block data and the slice data correspond to the same tissue block. For example, an image processing functions may include an edge analysis of the block data and the slice data and based on the edge analysis, determine whether the block data and the slice data correspond to the same tissue block. The image analysis system 108 can obtain a confidence threshold from the display device 110, the imaging device 102, or any other device. In some embodiments, the image analysis system 108 can determine the confidence threshold based on a response by the display device 110 to a particular recommendation. Further, the confidence threshold may be specific to a user, a group of users, a type of tissue block, a location of the tissue block, or any other factor. The image analysis system 108 can compare the determined confidence threshold with the image analysis performed by the image analysis module. Based on this comparison, the image analysis system 108 can generate a recommendation indicating a recommended action for the display device 110 based on the likelihood that the block data and the slice data correspond to the same tissue block. In other embodiments, the image analysis system 108 can provide a diagnosis regarding whether the image data is indicative of a disease present in the tissue sample, for example, based on the results of a machine learning algorithm.

The image analysis system 108 can transmit a signal to the display device 110. The image analysis system 108 can send the signal as an electrical signal 10 to the display device 110 via the network 112. The signal may include and/or correspond to a representation of the diagnosis. Based on receiving the signal, the display device 110 can determine the diagnosis. In some embodiments, the image analysis system 108 may transmit a series of recommendations corresponding to a group of tissues blocks and/or a group of slices. The image analysis system 108 can include, in the recommendation, a recommended action of a user. For example, the recommendation may include a recommendation for the user to review the tissue block and the slice. Further, the recommendation may include a recommendation that the user does not need to review the tissue block and the slice.

Imaging Prepared Blocks and Prepared Slices

Figure 2:
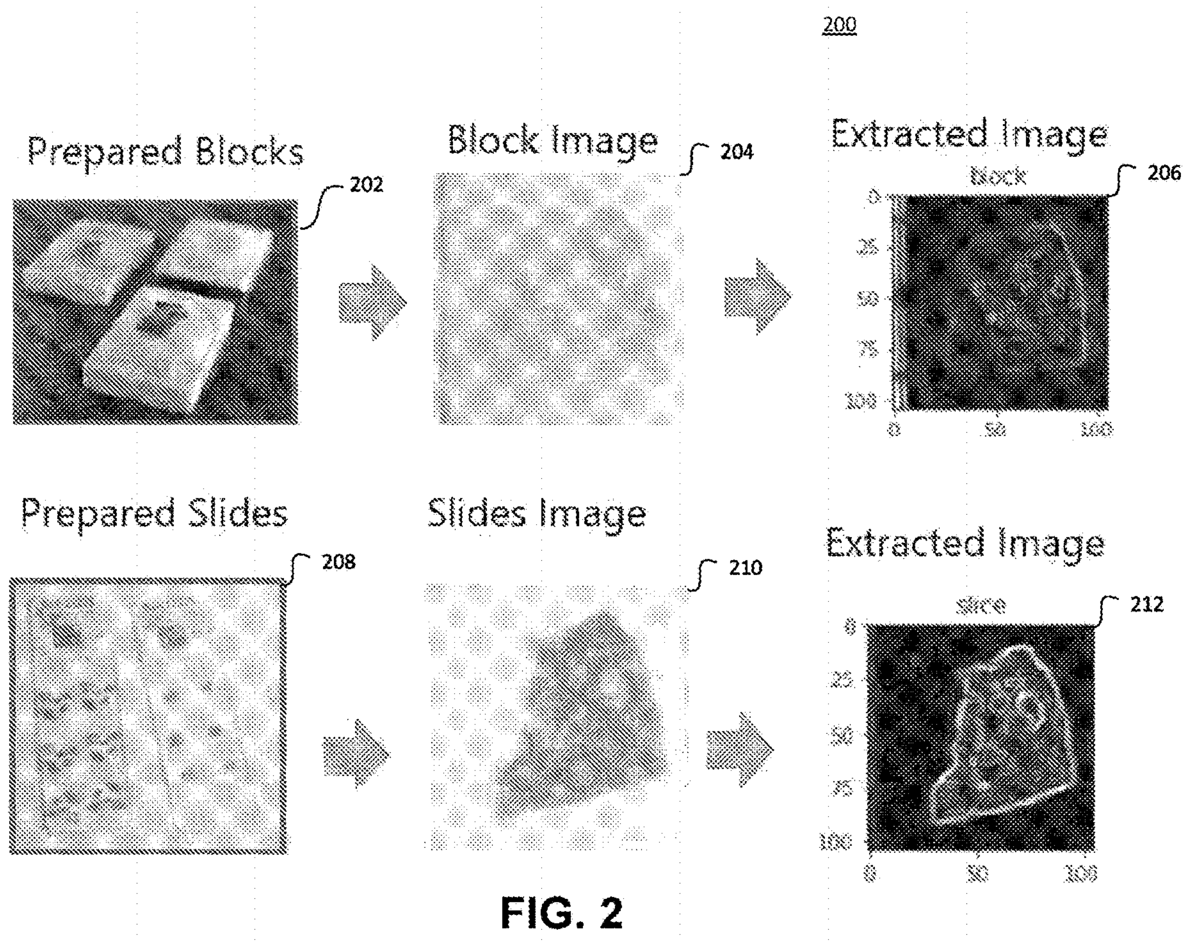
FIG. 2 depicts an example workflow for generating image data from a tissue sample block according to some embodiments.

FIG. 2 depicts an example workflow 200 for generating image data from a tissue sample block according to some embodiments. The example workflow 200 illustrates a process for generating prepared blocks and prepared slices from a tissue block and generating pre-processed images based on the prepared blocks and the prepared slices. The example workflow 200 may be implemented by one or more computing devices. For example, the example workflow 200 may be implemented by a microtome, a stainer, a coverslipper, and an imaging device. Each computing device may perform a portion of the example workflow. For example, the microtome may cut the tissue block in order to generate one or more slices of the tissue block. The slices are transferred (e.g., manually) to the slides. The stainer may stain the slides. The coverslipper places a cover slip over each of the stained samples. After coverslipping, the imaging device can image each slide.

A tissue block can be obtained from a patient (e.g., a human, an animal, etc.). The tissue block may correspond to a section of tissue from the patient. The tissue block may be surgically removed from the patient for further analysis. For example, the tissue block may be removed in order to determine if the tissue block has certain characteristics (e.g., if the tissue block is cancerous). In order to generate the prepared blocks 202, the tissue block may be prepared using a particular preparation process by a tissue processor. In the tissue processor the tissue will be dehydrated with multiple steps of alcohol and then infiltrated with molten paraffin wax to stabilize the tissue. For example, the tissue (sample) may be embedded in a paraffin wax block. The result will be a prepared block 202 FIG. 2. This block is ready for cutting with a microtome. The tissue block may also be embedded using an optimal cutting temperature ("OCT") compound. The preparation process may include one or more of a paraffin embedding, an OCT-embedding, or any other embedding of the tissue block. In the example of FIG. 2, the tissue block is embedded using paraffin embedding. Further, the tissue block is embedded within a paraffin wax block and mounted on a microscopic slide in order to formulate the prepared block.

The microtome can obtain a slice of the tissue block in order to generate the prepared slices 204. The microtome can use one or more blades to slice the tissue block and generate a slice (e.g., a section) of the tissue block. The microtome can further slice the tissue block to generate a slice with a preferred level of thickness. For example, the slice of the tissue block may be between 1p m (0.001 millimeter) and 60 μm (0.06 millimeters). The microtome can provide the slice of the tissue block to a coverslipper. In generating the prepared slices 204, a stainer may also stain the slice of the tissue block using any staining protocol. Further, the stainer may stain the slice of the tissue block in order to highlight certain portions of the prepared slices 204 (e.g., an area of interest). In some embodiments, a computing device may include both the coverslipper and the stainer and the slide may be stained as part of the process of generating the slide. After staining, a coverslipper can encase the slice of the tissue block between a coverslip and the slide to generate the prepared slices 204. The prepared slices 204 may include the slice mounted in a certain position.

The prepared blocks 202 and the prepared slices 204 may be provided to an imaging device for imaging. In some embodiments, the prepared blocks 202 and the prepared slices 204 may be provided to the same imaging device. In other embodiments, the prepared blocks 202 and the prepared slices 204 are provided to different imaging devices. The imaging device can perform one or more imaging operations on the prepared blocks 202 and the prepared slices 204. In some embodiments, a computing device may include one or more of the tissue preparer, the microtome, the coverslipper, the stainer, and/or the imaging device.

The imaging device can capture an image of the prepared block 202 in order to generate the block image 206. The block image 206 may be a representation of the prepared block 202. For example, the block image 206 may be a representation of the prepared block 202 from one direction (e.g., from above). The representation of the prepared block 202 may correspond to the same direction as the prepared slices 204 and/or the slice of the tissue block. For example, if the tissue block is sliced in a cross-sectional manner in order to generate the slice of the tissue block, the block image 206 may correspond to the same cross-sectional view. In order to generate the block image 206, the prepared block 202 may be placed in a cradle of the imaging device and imaged by the imaging device. Further, the block image 206 may include certain characteristics. For example, the block image 206 may be a color image with a particular resolution level, clarity level, zoom level, or any other image characteristics.

The imaging device can capture an image of the prepared slices 204 in order to generate the slice image 208. The imaging device can capture an image of a particular slice of the prepared slices 204. For example, a slide may include any number of prepared slices and the imaging device may capture an image of a particular slice of the prepared slices. The slice image 208 may be a representation of the prepared slices 204. The slice image 208 may correspond to a view of the slice according to how the slice of the tissue block was generated. For example, if the slice of the tissue block was generated via a cross-sectional cut of the tissue block, the slice image 208 may correspond to the same cross-sectional view. In order to generate the slice image 208, the slide containing the prepared slices 204 may be placed in a cradle of the imaging device (e.g., in a viewer of a microscope) and imaged by the imaging device. Further, the slice image 208 may include certain characteristics. For example, the slice image 208 may be a color image with a particular resolution level, clarity level, zoom level, or any other image characteristics.

The imaging device can process the block image 206 in order to generate a pre-processed image 210 and the slice image 208 in order to generate the pre-processed image 212. The imaging device can perform one or more image operations on the block image 206 and the slice image 208 in order to generate the pre-processed image 210 and the pre-processed image 212. The one or more image operations may include isolating (e.g., focusing on) various features of the pre-processed image 210 and the pre-processed imaged 212. For example, the one or more image operations may include isolating the edges of a slice or a tissue block, isolating areas of interest within a slice or a tissue block, or otherwise modifying (e.g., transforming) the block image 206 and/or the slice image 208. In some embodiments, the imaging device can perform the one or more image operations on one of the block image 206 or the slice image 208. For example, the imaging may perform the one or more image operations on the block image 206. In other embodiments, the imaging device can perform first image operations on the block image 206 and second image operations on the slice image 208. The imaging device may provide the pre-processed image 210 and the pre-processed image 212 to the image analysis system to determine a likelihood that the preprocessed image 210 and the pre-processed image 212 correspond to the same tissue block.

Slicing a Tissue Block

Figure 3A:
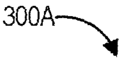
FIG. 3A illustrates an example prepared tissue block according to some embodiments.
Figure 3A:
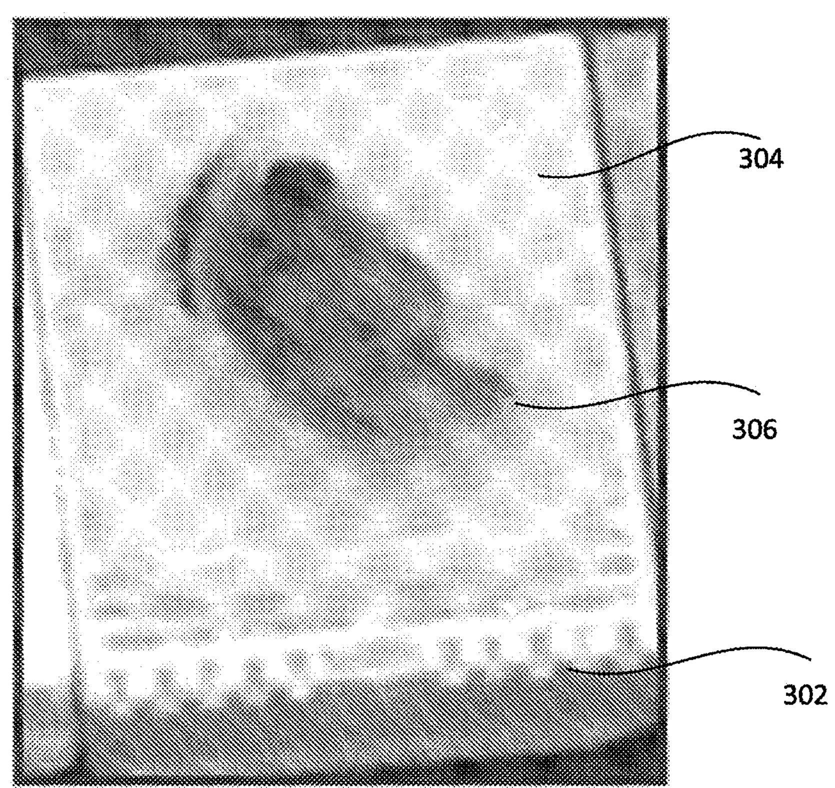

FIG. 3A illustrates an example prepared tissue block 300A according to some embodiments. The prepared tissue block 300A may include a tissue block 306 that is preserved (e.g., chemically preserved, fixed, supported) in a particular manner. In order to generate the prepared tissue block 300A, the tissue block 306 can be placed in a fixing agent (e.g., a liquid fixing agent). For example, the tissue block 306 can be placed in a fixative such as formaldehyde solution. The fixing agent can penetrate the tissue block 306 and preserve the tissue block 306. The tissue block 306 can subsequently be isolated in order to enable further preservation of the tissue block 306. Further, the tissue block 306 can be immersed in one or more solutions (e.g., ethanol solutions) in order to replace water within the tissue block 306 with the one or more solutions. The tissue block 306 can be immersed in one or more intermediate solutions. Further, the tissue block 306 can be immersed in a final solution (e.g., a histological wax). For example, the histological wax may be a purified paraffin wax. After being immersed in a final solution, the tissue block 306 may be formed into a prepared tissue block 300A. For example, the tissue block 306 may be placed into a mold filled with the histological wax. By placing the tissue block in the mold, the tissue block 306 may be molded (e.g., encased) in the final solution 304. In order to generate the prepared tissue block 300A, the tissue block 306 in the final solution 304 may be placed on a platform 302. Therefore, the prepared tissue block 300A may be generated. It will be understood that the prepared tissue block 300A may be prepared according to any tissue preparation methods.

Figure 3B:
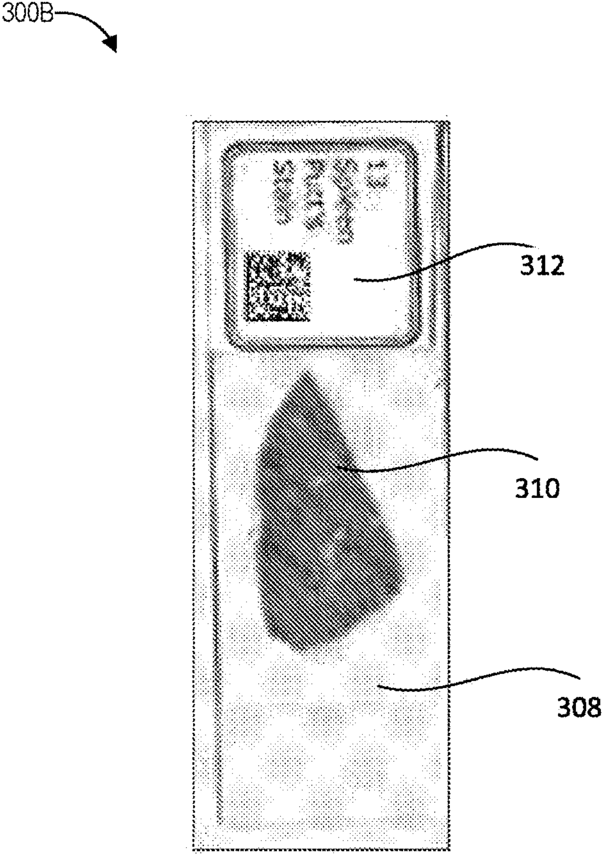
FIG. 3B illustrates an example prepared tissue block and an example prepared tissue slice 300B according to some embodiments.

FIG. 3B illustrates an example prepared tissue block 300A and an example prepared tissue slice 300B according to some embodiments. In order to generate the prepared tissue slice 300B, the prepared tissue block 300A may be sliced by a microtome. The microtome may include one or more blades to slice the prepared tissue block 300A. The microtome may take a cross-sectional slice 310 of the prepared tissue block 300A using the one or more blades. The cross-sectional slice 310 of the prepared tissue block 300A may include a slice 310 (e.g., a section) of the tissue block 306 encased in a slice of the final solution 304. In order to preserve the slice 310 of the tissue block 306, the slice 310 of the tissue block 306 may be modified (e.g., washed) to remove the final solution 304 from the slice 310 of the tissue block 306. For example, the final solution 304 may be rinsed and/or isolated from the slice 310 of the tissue block 306. Further, the slice 310 of the tissue block 306 may be stained by a stainer. In some embodiments, the slice 310 of the tissue block 306 may not be stained. The slice 310 of the tissue block 306 may subsequently be encased in a slide 308 by a coverslipper to generate the prepared tissue slice 300B. The prepared tissue slice 300B may include an identifier 312 identifying the tissue block 306 that corresponds to the prepared tissue slice 300B. The prepared tissue block 300A may also include an identifier that identifies the tissue block 306 that corresponds to the prepared tissue block 300A. As the prepared tissue block 300A and the prepared tissue slice 300B correspond to the same tissue block 306, the identifier of the prepared tissue block 300A and the identifier 312 of the prepared tissue slice 300B may identify the same tissue block 306.

Imaging Devices

Figure 4:
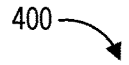
FIG. 4 shows an example imaging device, according to one embodiment.
Figure 4:
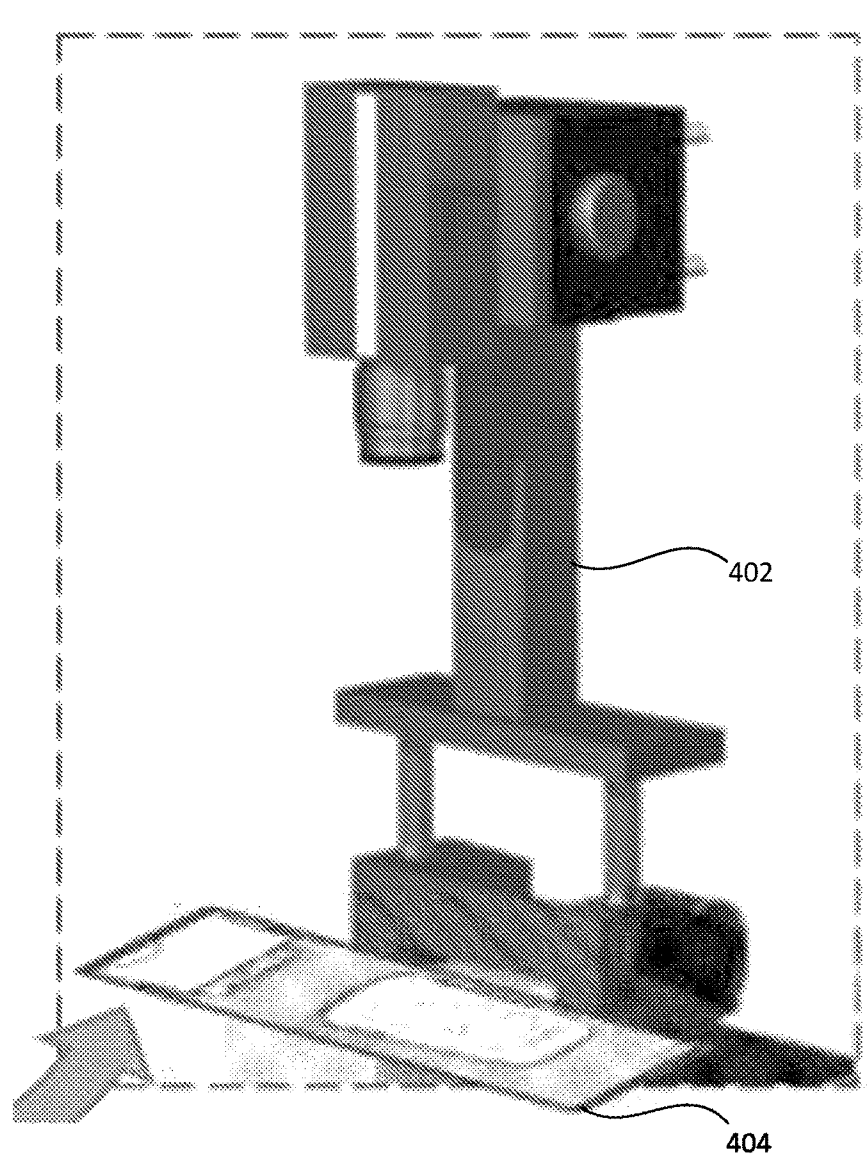

FIG. 4 shows an example imaging device 400, according to one embodiment. The imaging device 400 can include an imaging apparatus 402 (e.g., a lens and an image sensor) and a platform 404. The imaging device 400 can receive a prepared tissue block and/or a prepared tissue slice via the platform 404. Further, the imaging device can use the imaging apparatus 402 to capture image data corresponding to the prepared block and/or the prepared slice. The imaging device 400 can be one or more of a camera, a scanner, a medical imaging device, a microscope, etc. Further, the imaging device 400 can use imaging technologies such as X-ray radiography, magnetic resonance imaging, ultrasound, endoscopy, elastography, tactile imaging, thermography, medical photography, nuclear medicine functional imaging, positron emission tomography, single-photon emission computed tomography, etc. For example, the imaging device can be a magnetic resonance imaging ("MRI") scanner, a positron emission tomography ("PET") scanner, an ultrasound imaging device, an x-ray imaging device, a computerized tomography ("CT") scanner.

The imaging device 400 may receive one or more of the prepared tissue block and/or the prepared tissue slice and capture corresponding image data. In some embodiments, the imaging device 400 may capture image data corresponding to a plurality of prepared tissue slices and/or a plurality of prepared tissue blocks. The imaging device 400 may further capture, through the lens of the imaging apparatus 402, using the image sensor of the imaging apparatus 402, a representation of a prepared tissue slice and/or a prepared tissue block as placed on the platform. Therefore, the imaging device 400 can capture image data in order for the image analysis system to compare the image data to determine if the image data corresponds to the same tissue block.

Figure 5:
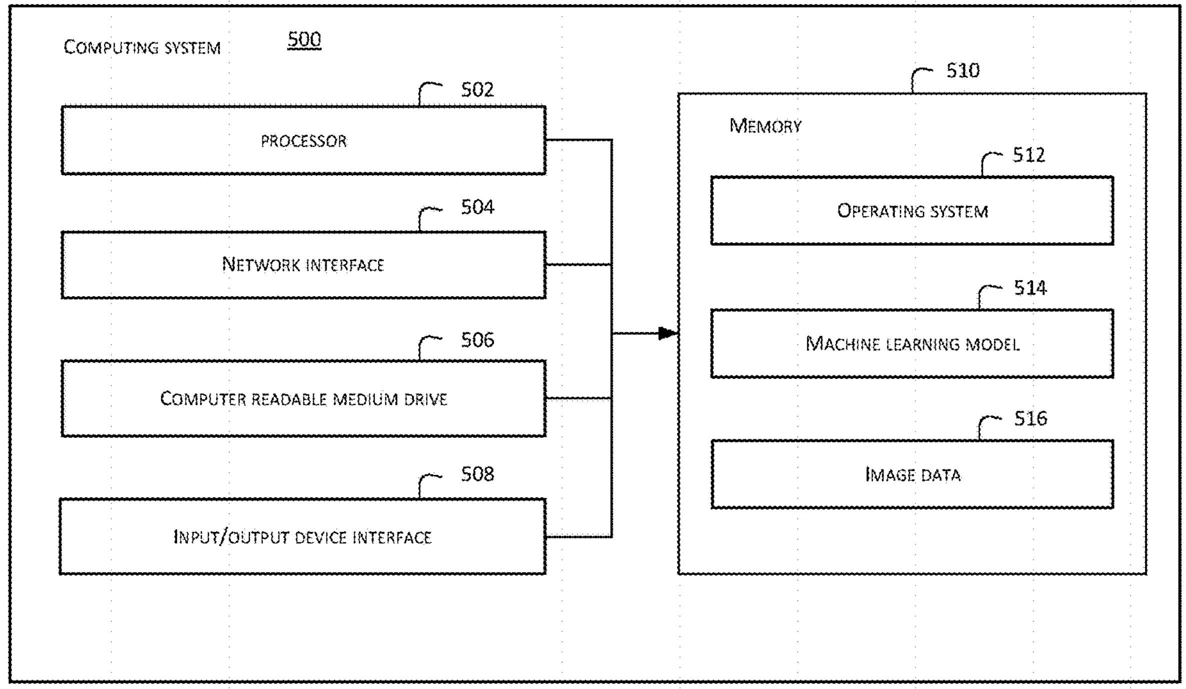
FIG. 5 is an example computing system which can implement any one or more of the imaging device, image analysis system, and user computing device of the multispectral imaging system illustrated in FIG. 1.

FIG. 5 is an example computing system 500 which, in various embodiments, can implement the functionality of one or more of the imaging device 102, image analysis system 108, and display device 110 of the multispectral imaging system illustrated in FIG. 1. In various embodiments, the computing system 500 can implement the functionality of the apparatus 605 and/or the display devices 620 illustrated in FIG. 6A. Referring to FIG. 5, the computing system 500 may include one or more hardware processors 502, such as physical central processing units ("CPUs"), one or more network interfaces 504, such as a network interface cards ("NICs"), and one or more computer readable medium 506. The computer readable medium can be, for example, a high density disk ("HDDs"), solid state drives ("SDDs"), flash drives, and/or other persistent non-transitory computer-readable media. The computing system 500 may also include an input/output device interface 508, such as an input/output ("IO") interface in communication with one or more microphones, and one or more non-transitory computer readable memory (or "medium") 510, such as random access memory ("RAM") and/or other volatile non-transitory computer-readable media.

The network interface 504 can provide connectivity to one or more networks or computing systems. The hardware processor 502 can receive information and instructions from other computing systems or services via the network interface 504. The network interface 504 can also store data directly to the computer-readable memory 510. The hardware processor 502 can communicate to and from the computer-readable memory 510, execute instructions and process data in the computer readable memory 510, etc.

The computer readable memory 510 may include computer program instructions that the hardware processor 502 executes in order to implement one or more embodiments. The computer readable memory 510 can store an operating system 512 that provides computer program instructions for use by the computer processor 502 in the general administration and operation of the computing system 500. The computer readable memory 510 can further include program instructions and other information for implementing aspects of the present disclosure. In one example, the computer readable medium includes instructions for determining quality of an image displayed on a display device. For example, the computer readable medium includes program instructions for causing a hardware processor to perform a method of determining that a configuration change has occurred at the display device, providing a test image to the display device, receiving test image display data from the display device, the test image pixel data generated by a processor of the display device by processing the test image, determining if the test image display data is different than a reference test image by more than a quality threshold, and in response to determining that the test image display data is different than the reference test image by more than a quality threshold, generating an indicator that the configuration change affects functionality of the display device. As another example, the computer-readable medium 510 may include image data 516. In another example, the computer readable medium 510 includes instructions to execute one or more of the processes 700 (FIG. 7A), 750 (FIG. 7B), and/or 770 (FIG. 7C). In some embodiments, multiple computing systems 500 may communicate with each other via respective network interfaces 504, and can implement multiple sessions each session with a corresponding connection parameter (e.g., each computing system 500 may execute one or more separate instances of processes described herein, for example, in FIG. 7A, FIG. 7B, and/or FIG. 7C in parallel (e.g., each for a different display device).

Figure 6B:
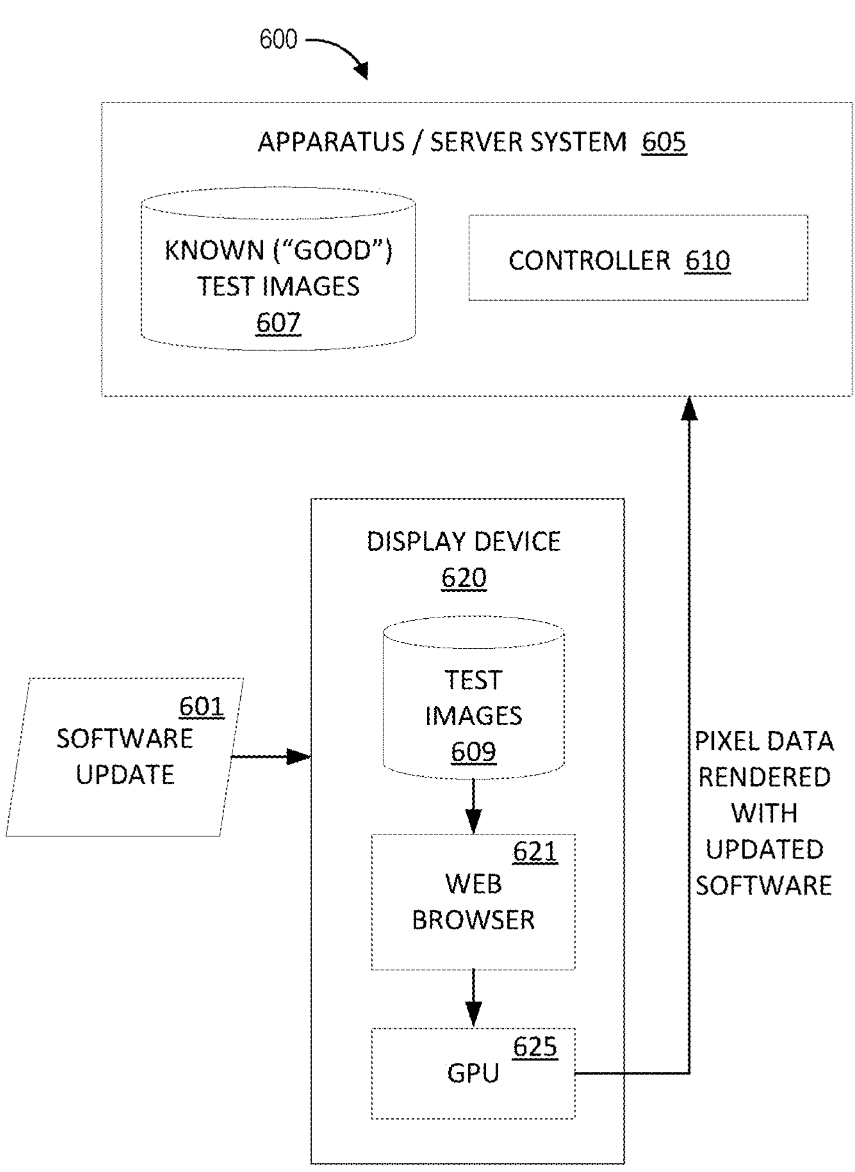
FIG. 6B is another example block diagram of a system for assessing quality of updated software (e.g., browser software) to determine if the update affected how a sample is displayed.

FIGS. 6A and 6B illustrate examples of block diagram of systems for assessing quality of browser software or other software that may affect how a sample is displayed. FIG. 6A illustrates an example block diagram of a system 600 that includes an apparatus (e.g., a server system) 605 in communication with one or more display devices 620, the server system 605 configured to provide an image to the display device(s) 620 to be processed (e.g., "rendered") by updated software on the display device and the resulting pixel data is provided to the server system 605 for testing to ensure the updated software did not affect the image chain (or "pixel pipeline"). FIG. 6B illustrates an example block diagram of a system 600 that includes an apparatus (e.g., a server system) 605 in communication with one or more display devices 620, where when the display device 620 receives a software update it generates pixel data with the updated software and provides it to the server system 605 for testing to ensure the updated software did not affect the image chain. In both of these examples, the apparatus 605 can receive pixel data from a display device 620, the pixel data being rendered by updated software after a configuration change has occurred, and the apparatus 605 can determine if the updated software affects the functionality of the system, for example, the communication, compression/storage, or display of images by the display device 620.

Figure 11:
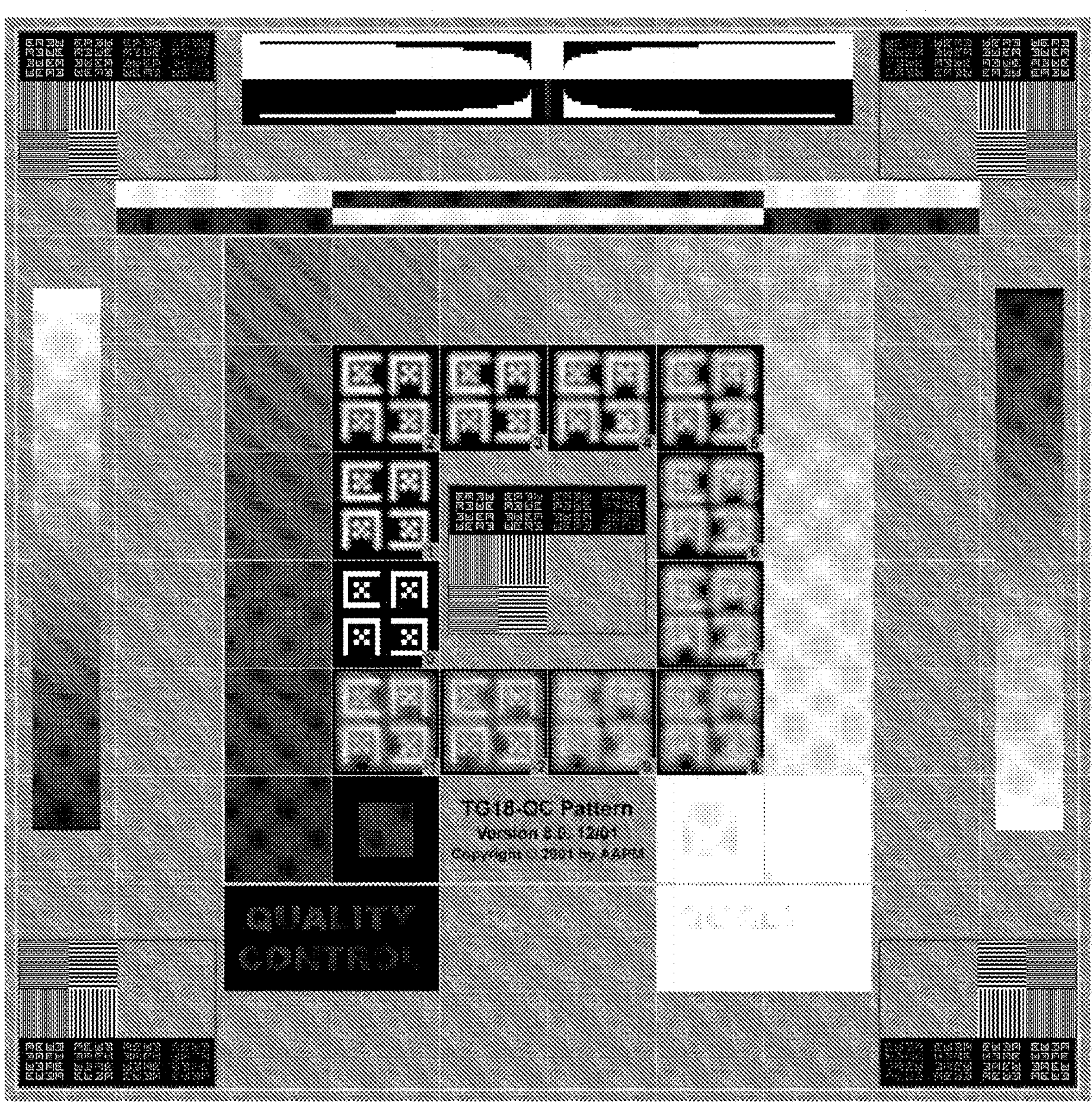
FIG. 11 is an example of a test target image that can be displayed and used for visual verification that a configuration update did not cause a discernable change in a displayed image.

Referring to FIG. 6A, each display device 620 can have an image server 622 and an image renderer 624. The image server 622 includes can include hardware and/or software that is used to communicate with the server system 605, including to receive images communicated from the server system 605 and provide information and pixel data (e.g., generated by the image renderer 624) to the server system 605. The image renderer 624 can include a graphics processing unit (GPU) that includes specialized electronic circuits designed to rapidly manipulate and alter memory to accelerate the creation of images in a frame buffer for outputting to a display of the display device 620. In embodiments where the display device 620 includes an image renderer 624 with a GPU, the GPU can create the pixel data that is actually displayed on a display screen. As described above, the image chain or pixel pipeline refers to a portion of, or the entirety of, software, hardware, firmware, lookup tables, data, or information that is used to generate, process and/or display an image. Any portion of the image chain can affect the way the image is displayed to a user. The image can be, for example, a test image that is processed by the image chain and displayed for a user to visually evaluate to confirm that the image is displayed properly. An example of a test image is illustrated in FIG. 11. Many other examples of test images may be used. The image chain can include functionality that compresses and/or decompresses a patient image during any part of the image storage, transmission, and/or display process (e.g., display of an image on a display device). The image chain can also include a web browser functionality that is used to receive images from the apparatus 605, and process the images to generate data for display, and, then display images on the display device 620.

Different portions the system 600 can be controlled by software, data, and information that can originate from different vendors. For example, one vendor may provide storage and compression functionality, and another vendor may provide communication functionality, and another vendor may provide web browser functionality. Even in instances where the system 600 is provided by a single vendor, components of the system 600 may have originated from different sources, where each different source generates and controls its own software, hardware, firmware, data, information that it uses in its component. As a result, the image chain of even a system may include dozens, hundreds, or thousands of different software packets/modules/files that are updated over the life of the system, for example, to fix a software bug or to provide increased or improved functionality. Any change to imaging functionality including software, hardware, firmware, data, information etc. is referred to herein as a "configuration change" or an "update" for ease of reference.

During operation, a user (e.g., the pathologist) becomes accustomed to viewing images of tissue samples having consistent image characteristics. The image characteristics may include one or more of color, brightness, contrast, dynamic range, hue, and sharpness, or other characteristics.

A pathologist relies on these image characteristics to assess information relating to the tissue sample, and expects these image characteristics to be consistent (as possible) from tissue sample-to-tissue sample, image-to-image. This consistency allows the pathologist to more efficiently evaluate images and more accurately understand features in the images. Thus, it is important that image characteristics displayed on display devices 620 are not changed unexpectedly configuration changes.

Accordingly, when there is a configuration change to imaging functionality related to an image chain, there is a risk that images processed and displayed by the image chain may be displayed differently, and thus may be perceived differently by the user which could result in inaccurate and inconsistent analysis of the sample represented by the image. The displayed image, and the image chain, can be affected by storing the image including compression of the image (e.g., when lossy image compression or storage functionality is used), communication of image data between the apparatus 605 and the display device 620 or within the apparatus 605 or the display device 620, and rendering and display of the image data. While display screen calibration can also affect the user's perception of an image, the changes to the image data referred to herein are actual changes to the rendered image data, and calibration of the display screen is a different (but also important) issue. The changes to the rendered image data addressed here are changes to the actual pixel values of the image data caused by updated software.

To mitigate this risk, the apparatus can monitor configuration changes to display devices 620, and any time a configuration change is made to a display device 620 that may affect the image chain, or any time a configuration change is made to any communications or control signals communicated to the display device 620, the apparatus 605 can run a test to see if the configuration change has affected functionality for displaying an image to a user on the display device. In some embodiments, the system 600 can be configured to automatically monitor its configuration and when a change to the configuration occurs, to automatically run a test to see if the configuration change affected the way the image is displayed on the display device. In some embodiments, the system can be configured to automatically monitor its configuration and when a configuration change occurs, to notify (e.g., via email or a txt message) one or more users that the configuration change has occurred and that a test may be necessary to determine the effect of the configuration change, and the user may provide an input to start the test. In one example, the test can include processing a test image using the updated image chain (that is, the image chain that includes the configuration change) and then comparing pixel values of the test image (that is ready for display) to pixel values that represent pixel values of the test image that has been processed to be ready for display before the configuration change occurred. For example, a previously stored test image that has been processed to be ready for display before the configuration change occurred. If there is a difference between the image generated using the configuration change and the image generated before the configuration change, or if the difference is significant (e.g., greater than a threshold or such that it can be perceived by the user), then the configuration change can be deemed to be adverse and corrective measures can be taken. For example, the configuration change may be changed back previous configuration change, or another change to the configuration may be made.

Still referring to FIG. 6A, the apparatus 605 can include stored patient images 606 and stored test images and information 607. During the course of normal operations, the apparatus 605 can provide patient images 606 to one or more display device 620. In some embodiments, the apparatus 605 generates displayable pixel data (e.g., the data that is actually displayed. In some typical embodiments, the display device 620 generates the displayable pixel data. That is, the display device 620 processes a patient image to generate displayable pixel data (e.g., using processes on the display device 620), and then displays the pixel data on a display of the display device 620. When the apparatus 605 determines that a configuration change has occurred on a display device 620, the apparatus 605 can provide a test image 607 to the updated display device 620 to determine if the configuration change affects the image chain of the display device 620. The apparatus 605 can include a controller 610 which can include one or more hardware processors. The controller 610 can be configured with image server functionality 611 to provide patient images 606 and test images 607 to the display devices 620. The controller 610 can also be configured with image compare functionality 612 to compare test image display data received from a display device 620, that has undergone a configuration change, to a reference test image and determine if the difference between the test image display data in the reference test image is significant, for example, whether if difference exceeds a threshold value. The apparatus controller 610 can also be configured with communications/control evaluation functionality 613 to determine if a configuration change to a display device 620 has affected the communications with the display device 620, and if the configuration change to the display device 610 has affected control signals (or information) that is used to generate images for display on the display device 620.

In some embodiments, the apparatus 605 determines if the configuration change has been made to a display device by collecting a web browser "fingerprint" and comparing it against verified versions of the web browser (e.g., previously collected fingerprints). The fingerprint is a representation of what software is being run by the web browser. In some embodiments, the "fingerprint" can represent a list of one or more versions of software that is being used by the web browser. In some embodiments, the fingerprint can represent a value or a "hash" representing one or more versions of software that are being used by the web browser. If the apparatus 605 determines that a test has already been run for the configuration fingerprint of a display device, no further testing is necessary. If the apparatus 605 determines that test is not been run for the configuration fingerprint of a display device the testing process can continue.

The apparatus 605 can then provide the test image (for example, the test image shown in FIG. 11) to the display device. This can verify the following:

Exchange of static code to display device is not impacted;

Execution of static control code by display device is not impacted;

Copy operations and pass through to/from a GPU on the display device 620 (or a GPU on the server system 605) as part of the image chain, to the web browser on the display device is not impacted; and Compilation of GPU code on the server system 605 and/or a display device 620 does not cause errors.

If the test image data is received and rendered (e.g., by a GPU) then the communication portion of the test (e.g., communication of a test image to the display device 620) can be deemed successful.

Then, the image buffer in the GPU of the display device 620, prior to sending the rendered test image data to the browser, can be provided back to the server system 605. If this is successful, the apparatus can then perform a pixel to pixel comparison of a reference test image (e.g., a ground truth image) against the pixel values rendered by the browser on the display device 620. This can verify, for example, exchange of image data and copy operations to GPU imaging pipeline is not impacted;
compilation of static shader GPU code is not impacted;
luminosity remains unchanged in rendered image;
color drive levels remain unchanged in rendered image;
brightness/contrast remain unchanged in rendered image;
registration/scaling/skew was not introduced to rendered image;
ringing was not introduced to rendered image;
contouring remains unchanged in the rendered image;
posterization was not introduced into image;
aliasing was not introduced into image; and/or
sub-image artifacts were not introduced into the rendered image.

In some embodiments, a color checker target can also be transmitted from the server system 605 to the display device 620 and the color checker target can be rendered in the web browser on the display device 620 (e.g., via the GPU in the image renderer 624). The image data in the image buffer of the GPU in the image renderer on the display device 620 can be captured at the end of the image rendering process and, prior to it being sent to be displayed on the display device 620, and the image data can be transmitted back to the server system 605. The server system 605 can then perform pixel-to-pixel comparison of a reference test image against pixel values rendered by the web browser. This process can verify the following:

luminosity remains unchanged (or substantially unchanged, e.g., within a predetermined threshold) in the rendered image;
color drive levels remain unchanged (or substantially unchanged, e.g., within a predetermined threshold) in the rendered image; and
brightness/contrast remain unchanged (or substantially unchanged, e.g., within a predetermined threshold) in the rendered image.

In some embodiments, if pixel data of the reference test image and the pixel values rendered by the web browser are not identical across entire image than the apparatus 605 determines the image display functionality is not been affected by the configuration change; pixel data of the reference test image and the pixel values rendered by the web browser are different but the difference is less than a certain threshold, then the apparatus 605 determines the image display functionality is not been significantly affected by the configuration change; and if pixel data of the reference test image in the pixel values rendered by the web browser at different in the difference is greater than a certain threshold, then the apparatus 605 can determine the display functionality has been significantly affected by the configuration change, and the apparatus 605 can generate notification, which can be displayed on the apparatus 605, the display device 620, and/or sent to another computer or to a user.

In FIG. 6B illustrates an example block diagram of another embodiment of system 600 that includes an apparatus (e.g., a server system) 605 in communication with one or more display devices 620. The display device 620 includes, or has access to, one or more test images 609. The display device 620 also includes web browser functionality 621 and an image rendering functionality exemplified by GPU 625. In this implementation, the display device 601 receives a software update 601, and the update is implemented. After the software update, the display device 620 processes one or more test images 609 using the updated software. For example, the display device 620 retrieves a test image and processes with the web browser 621 and GPU 625 and renders pixel data for display on a display screen. Instead of displaying the data, the display device 620 communicates the pixel data rendered with the updated software to the apparatus 605. The apparatus 605 includes copies of the test image data in the form where it has been processed by the display device 620, and these are deemed to be known or "good" copies of the test images, the standard which any newly rendered data (rendered with updated software) is compared to. Then, similar to the implementation described in FIG. 6A, the apparatus 605 compares the pixel data rendered with updated software to the "good" test image and determines if the updated software has caused a detrimental affect on the image chain, and take any necessary actions (e.g., send a message to the user that the update is good/bad, communicate to the display device to remove/backout the update, etc.).

Figure 7A:
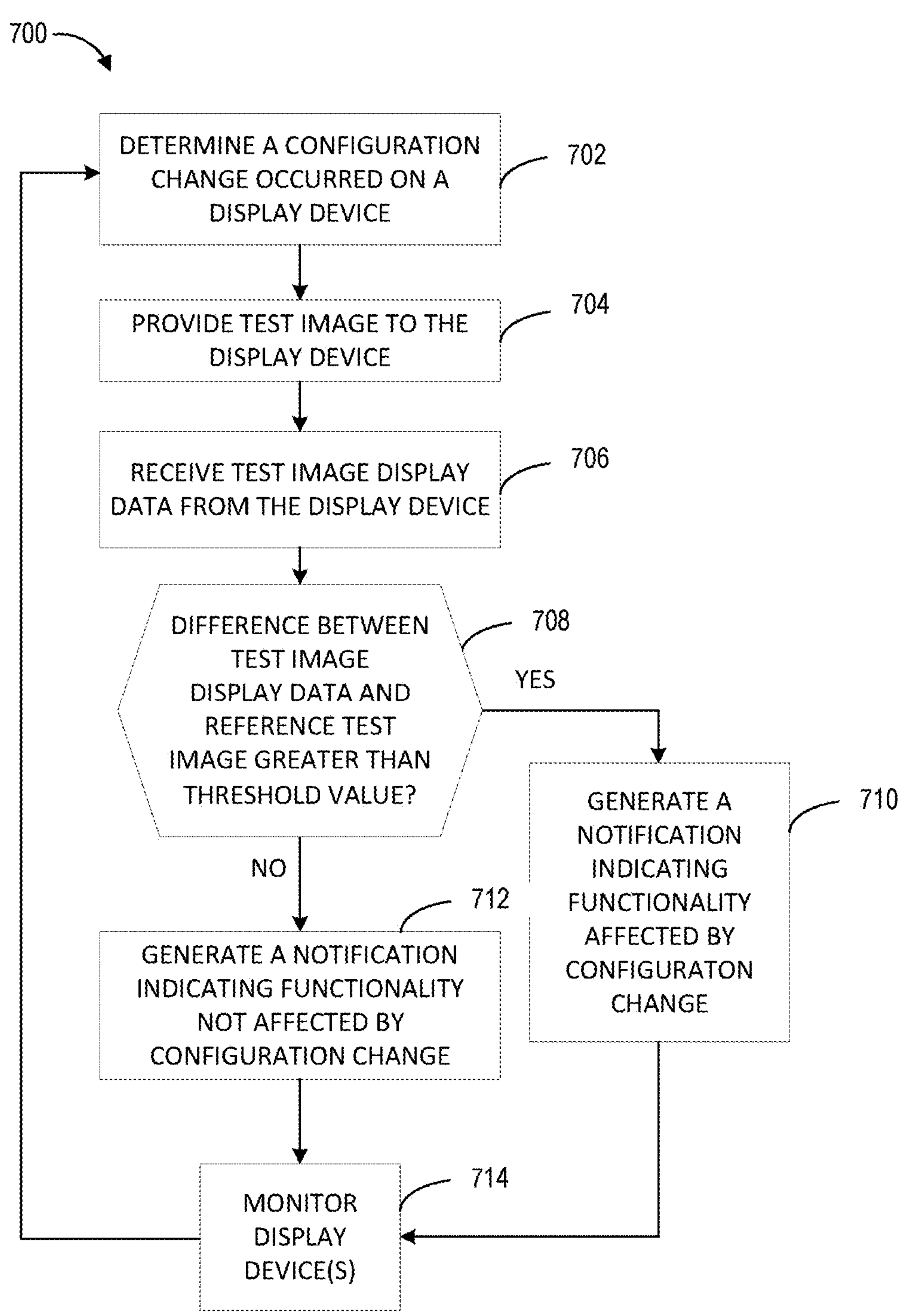
FIG. 7A is a flowchart illustrating a method that can occur, e.g., on an apparatus, for assessing a configuration change or new software (e.g., browser software) that may affect how a sample is displayed on a display device.
Figure 7B:
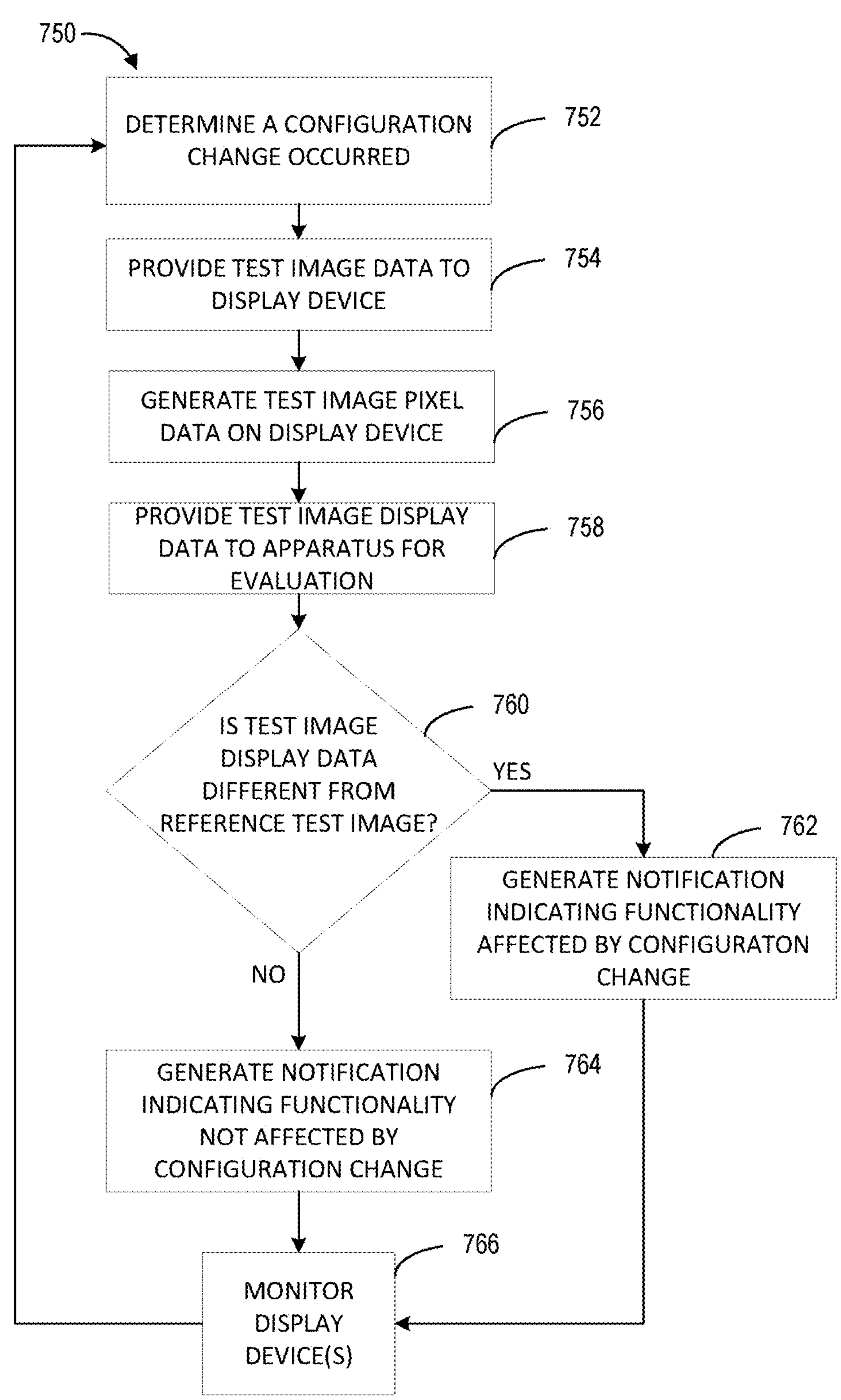
FIG. 7B is a flowchart illustrating another method that can occur on a system that includes an apparatus and at least one display device in communication with the apparatus, for assessing a configuration change or new software (e.g., browser software) that may affect how a sample is displayed on a display device.
Figure 7C:
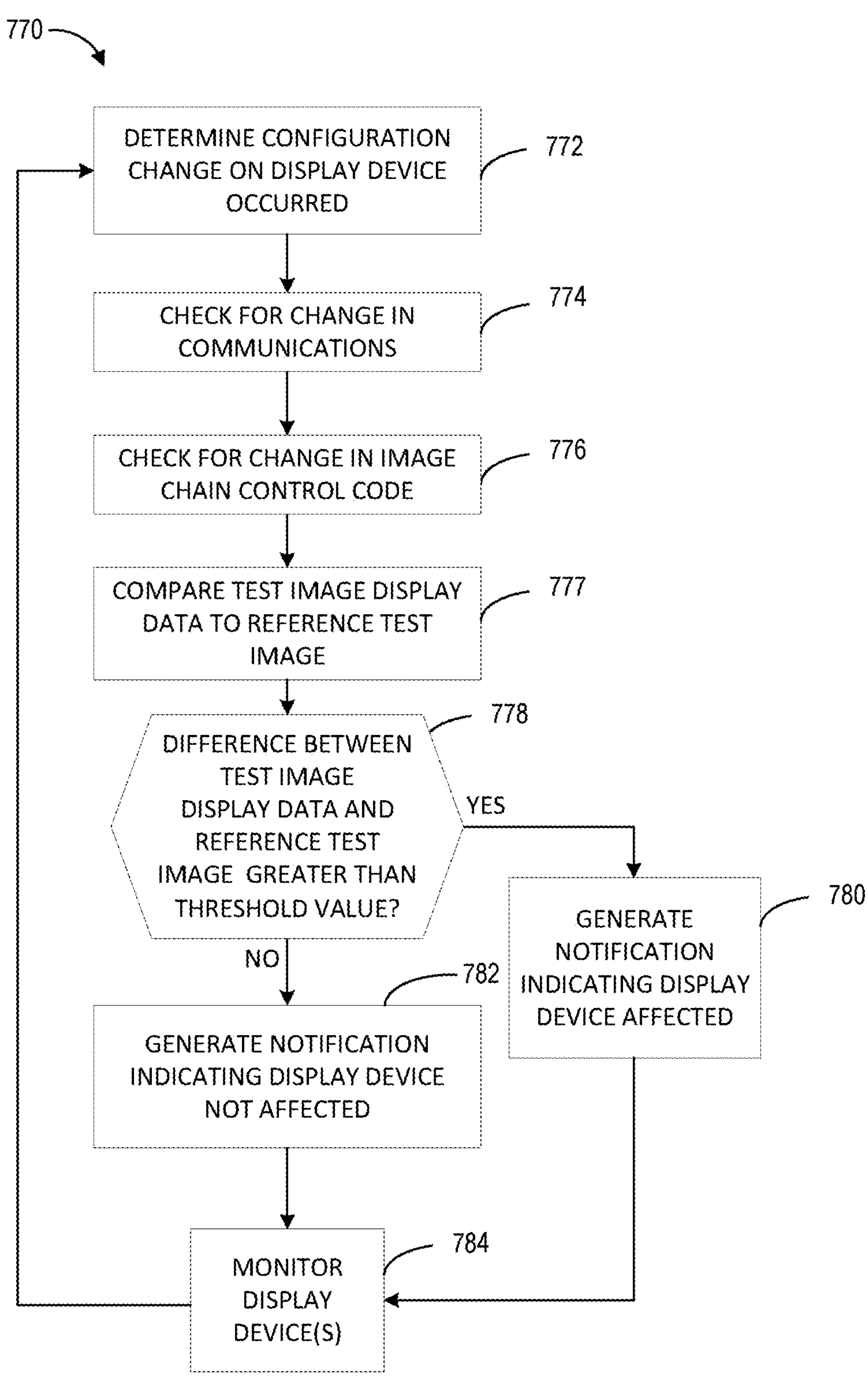
FIG. 7C is a flowchart illustrating another method that can occur, e.g., on an apparatus, for assessing a configuration change or new software (e.g., browser software) that may affect how a sample is displayed on a display device.

FIGS. 7A-7C illustrate examples of a process that can be performed by a system for determining if a configuration change on a display device affects how an image is displayed on the display device, for example, the system 600 illustrated in FIG. 6A, according to various embodiments.

FIG. 7A is a flowchart illustrating a process 700 that can occur (e.g., on the apparatus) for determining if a configuration change on a display device affects how an image is displayed on the display device. At block 702, the process 700 determines that a configuration change has occurred on a display device. In an example, the apparatus can compare the fingerprint, of the display device, that is indicative of the configuration of the display device, to a previous fingerprint of that particular display device to see if the configuration change has occurred. At block 704, the process 700 provides a test image to the display device. At block 706, the process 700 can receive test image display data from the display device at the apparatus, the test image display data representing data resulting from processing a test image on the display device, the test image display data being data that would be sent to be displayed on a display device.

At block 708, the process 700 compares the test image display data and a reference test image, and determines if the difference is greater than a threshold value. If it is, at block 710 the apparatus generates a notification indicating that functionality relating to the display device has been affected by the configuration change. If the difference is less than a threshold value, at block 712 the process generates a notification indicating functionality related to the display device has not been affected by the configuration change. At block 714, the process 700 continues to monitor one or more display devices that are in communication with the apparatus in the process 700 loops back to block 702 where it can further determine if a configuration change has occurred on a display device, for example, when the display device communicates with the apparatus.

FIG. 7B is a flowchart illustrating another process 750 that can occur on a system that includes an apparatus and at least one display device in communication with the apparatus, for assessing if a configuration change affects how an image is displayed on a display device. The process 750 can be performed by the system 600 illustrated in FIG. 6A. At block 752, the process 750 determines that a configuration change has occurred on a display device. In an example, the apparatus can compare the fingerprint, of the display device, that is indicative of the configuration of the display device, to a previous fingerprint of that particular display device to see if the configuration change has occurred. At block 754, the process 750 transmits a test image to the display device. At block 756, process 750 generates test image pixel data based on received test image, the test image pixel data being identical to data that is provided to a display on a display device. At block 758, process 750 receives the test image display data from the display device.

At block 760, the process 750 compares the test image display data and a reference test image, and determines if the test image display data is different from a reference test image. For example, the apparatus can determine if the test image display data is different from a reference test image such that the difference is greater than a threshold value. If it is, at block 762 the process 750 generates a notification indicating that functionality relating to the display device has been affected by the configuration change. If the difference is less than a threshold value, at block 764 the process 750 generates a notification indicating functionality related to the display device has not been affected by the configuration change. At block 766, the process 750 continues to monitor one or more display devices that are in communication with the apparatus in the process 750 loops back to block 752 where it can further determine if a configuration change has occurred on a display device, for example, when the display device communicates with the apparatus.

FIG. 7C is a flowchart illustrating another process 770 that can occur (e.g., on an apparatus) for assessing if a configuration change affects how a sample is displayed on a display device. The process 770 can be performed by the system 600 illustrated in FIG. 6A. At block 772, the process 770 determines that a configuration change has occurred on a display device. In an example, the process 770 can compare the fingerprint, of the display device, that is indicative of the configuration of the display device, to a previous fingerprint of that particular display device to see if the configuration change has occurred. At block 754, the process 770 transmits a test image to the display device. At block 756, the process 770 display device generates test image pixel data (on the display device) based on received test image, the test image pixel data being identical to data that is provided to a display on a display device. At block 758, the process 770 receives the test image display data from the display device.

At block 760, the process 770 compares the test image display data and a reference test image, and determines if the test image display data is different from a reference test image. For example, the process 770 can determine if the test image display data is different from a reference test image such that the difference is greater than a threshold value. If it is, at block 762 the process 770 generates a notification indicating that functionality relating to the display device has been affected by the configuration change. If the difference is less than a threshold value, at block 764 the process 770 generates a notification indicating functionality related to the display device has not been affected by the configuration change. At block 766, the process 770 continues to monitor one or more display devices that are in communication with the apparatus in the process 750 loops back to block 752 where it can further determine if a configuration change has occurred on a display device, for example, when the display device communicates with the apparatus.

Image Analysis Interface Functionality

Figure 8:
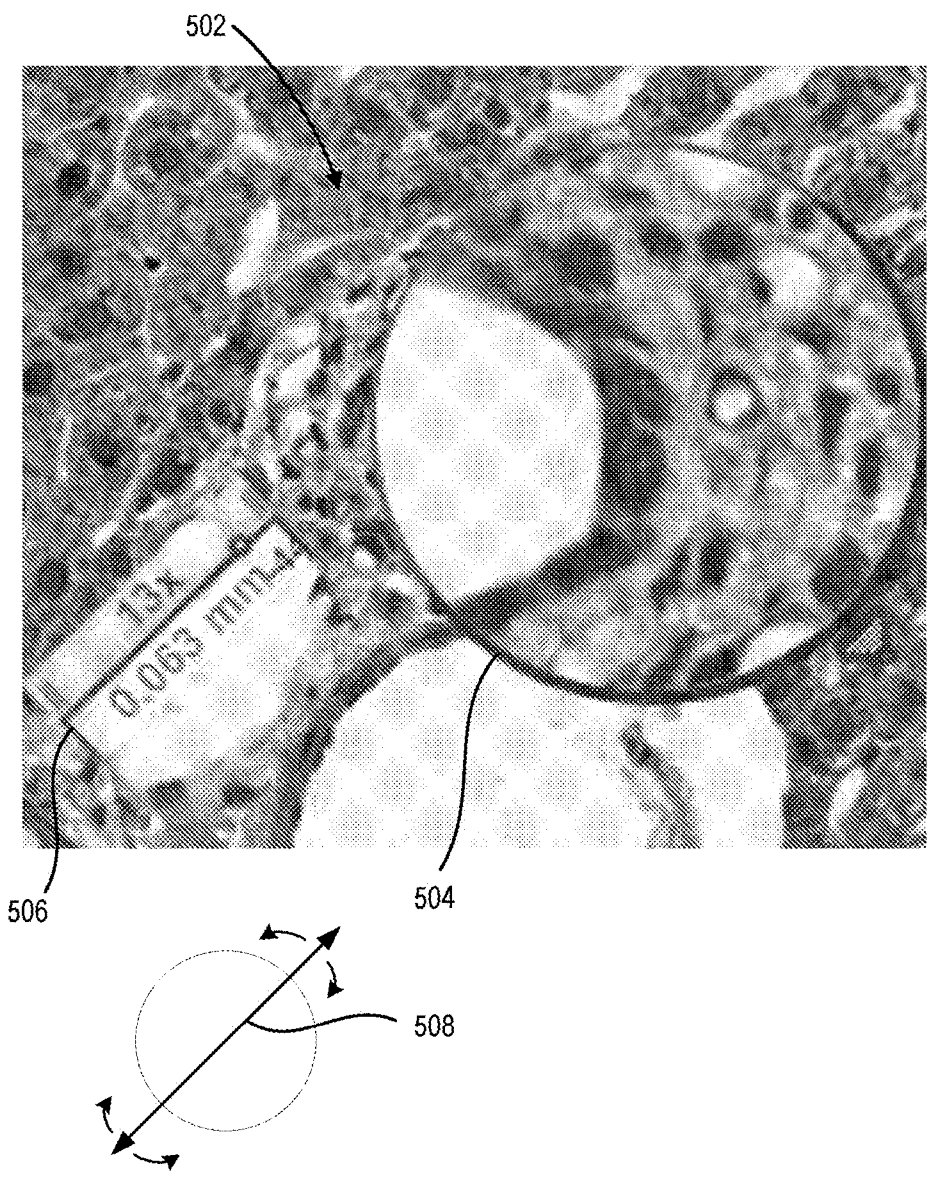
FIG. 8 illustrates a portion of an interface a depicting a tissue sample, a resizable magnifier that enlarges the portion of the screen on which it is overlaid, and a scale bar (measuring stick) that can be dragged and resized to measure various features, where the units displayed are determined by a received computer input (e.g., a unit-converter extension).

FIG. 8 is illustrates a portion of an interface that can be generated and displayed on an the display of the image analysis system, the interface depicting a tissue sample 802, a resizable magnifier 804 that enlarges the portion of the screen on which it is overlaid, and a scale bar (measuring stick) 806 that can be dragged and resized to measure various features, where the units displayed are determined by a received computer input (e.g., a unit-converter extension). The magnifier 804 and the scale bar 806 can be moved to various portions over the tissue sample 802 by a user control, for example, a mouse, keyboard, touchscreen, etc. The system is configured to provide the scale bar 806 on the interface such that the scale bar 806 can be moved and rotated in any direction to easily measure features in the tissue sample 802. For example, as illustrated by the alignment indicator 808, the scale bar 806 can be rotated 360° such that the alignment of the scale bar 806 can be in any direction such that it can be easily used to measure if each of the tissue sample. In some embodiments, the scale bar 806 relies on the unit converter extension to display desired units.

Figure 9:
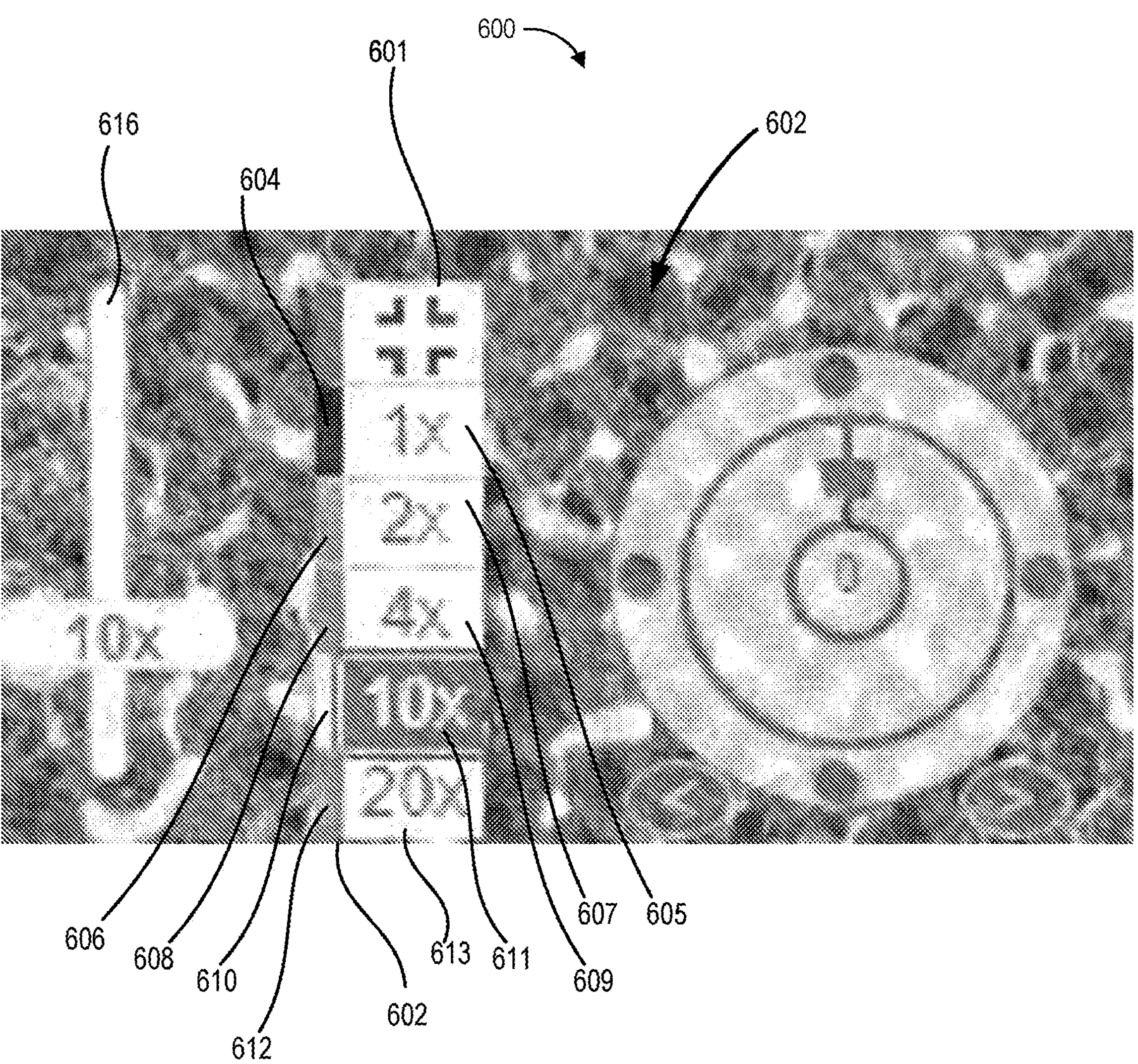
FIG. 9 illustrates a portion of an interface depicting a tissue sample, selectable coarse zoom bar configured to receive a user input to adjust a zoom level, the zoom bar on the interface having color-coded magnification levels associated with a magnification that is representative of the color of a physical optical element used on a microscope.

FIG. 9 illustrates a portion of an interface depicting a tissue sample, selectable coarse zoom bar 901 configured to receive a user input to adjust a zoom level, the zoom bar 901 on the interface having color-coded magnification levels associated with a magnification that is representative of the color of a physical optical element used on a microscope. The zoom bar 901 is displayed on interface 900 overlaid on a sample image 902. In this example, the coarse zoom bar 901 includes selectable icons for a 1× magnification 605 having a black corresponding color code 904, a 2× magnification 907 having an olive green corresponding color code 906, a 4× magnification 609 having a red corresponding color code 908, a 10× application 911 having a yellow corresponding color code 910, and a 20× magnification 913 having a green corresponding color code 912. A display bar 916 indicates the selected m magnification. By color coding the icons to correspond with the standardized/common color coding of optical components on a microscope the user can more easily select desired magnification.

Figure 10:
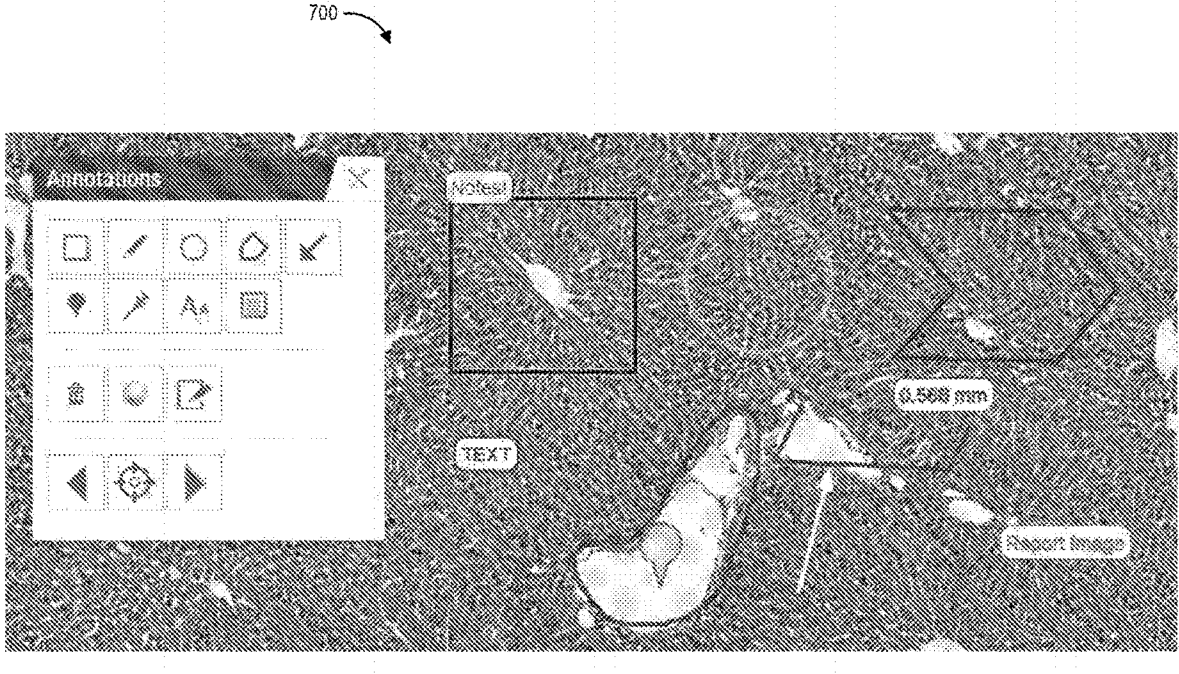
FIG. 10 illustrates a portion of an interface of a system for analyzing tissue sample, the interface depicting a sample, an annotation menu box, geometric features drawn on the interface overlying the sample, and textual annotations also on the interface and overlying the sample, where the system is configured to capture the geometric features and textual annotations, and the displayed image they are overlaid thereon, save the geometric features and textual annotations, and the displayed image, the geometric features and textual annotations saved in the relative position they are drawn with respect to the image, and upon receiving a request, produce information that includes the geometric features, displayed image and textual annotations, where the produced information can be rendered on a display or printed in a report.

FIG. 10 illustrates a portion of an interface of a system for analyzing tissue sample, the interface depicting a sample, an annotation menu box, geometric features drawn on the interface overlying the sample, and textual annotations also on the interface and overlying the sample, where the system is configured to capture the geometric features and textual annotations, and the displayed image they are overlaid thereon, save the geometric features and textual annotations, and the displayed image, the geometric features and textual annotations saved in the relative position they are drawn with respect to the image, and upon receiving a request, produce information that includes the geometric features, displayed image and textual annotations, where the produced information can be rendered on a display or printed in a report.

EXAMPLE EMBODIMENTS

Certain embodiments of systems and methods for quality assurance of pixel pipelines are listed below. However, the invention is not to be limited to these listed embodiments, and other embodiments of systems and methods for quality assurance of pixel pipelines that include other features exist.

Embodiment 1: An apparatus for determining quality of an image displayed on a display device, comprising: a hardware memory configured to store executable instructions; and a hardware processor in communication with the hardware memory, wherein the executable instructions, when executed by the processor, configure the processor to: determine that a configuration change has occurred at the display device; provide a test image to the display device; receive test image display data from the display device, the test image display data generated by a processor of the display device by processing the test image; determine if the test image display data is different than a reference test image by more than a quality threshold; and in response to determining that the test image display data is different than the reference test image by more than a quality threshold, generate an indicator that the configuration change affects functionality of the display device.

Embodiment 2: The apparatus of embodiment 1, wherein the reference test image is representative of the test image processed by the display device prior to the configuration change. Embodiment 3: The apparatus of embodiments 1 or 2, wherein the reference test image is representative of expected test image display data, of the test image, generated by the display device. Embodiment 4: The apparatus of any one of embodiments 1-3, wherein the processor is configured to determine if the test image display data is different than a reference test image by more than a quality threshold by comparing corresponding pixel values in the test image display data and the reference test image. Embodiment 5: The apparatus of any one of embodiments 1-4, wherein the executable instructions, when executed by the processor, further configure the processor to, in response to determining a configuration change has occurred: determine if there is a change in communication signals between the apparatus and the display device, and if there is a change in the communication signals between the apparatus and the display device, generate a notification that the configuration change affects communications with the display device. Embodiment 6: The apparatus of any one of embodiments 1-5, wherein the executable instructions, when executed by the processor, further configure the processor to, in response to determining a configuration change has occurred: determine if there is a change in control codes that are used to initiate rendering images on the display device; and if there is a change in the control codes that are used to initiate rendering images on the display device, generate a notification that the configuration change affects the control codes.

Embodiment 7: The apparatus of any one of embodiments 1-6, wherein the processor is configured to determine if the test image display data is different than a reference test image by more than the quality threshold by determining the number of pixels in the test image display data that are different than the reference test image. Embodiment 8: The apparatus of any one of embodiments 1-7, wherein the quality control threshold is a predetermined number of pixels, and wherein the processor is configured to determine if the test image data is different than the reference image data by more than a quality threshold by determining if a number of pixels in the test image display data that are different than the corresponding pixels in the reference test image is greater than the predetermined number of pixels. Embodiment 9: The apparatus of any one of embodiments 1-8, wherein the quality control threshold is a predetermined percentage of pixels, and wherein the processor is configured to determine if the test image data is different than the reference image data by more than a quality threshold by determining if a number of pixels in the test image display data that are different than the corresponding pixels in the reference test image is greater than the predetermined percentage of pixels. Embodiment 10: The apparatus of any one of embodiments 1-9, wherein the quality control threshold is a predetermined value, and wherein the processor is configured to determine if the test image data is different than the reference image data by more than a quality threshold by determining if a sum of the differences of values of the pixels in the test image display data and values of corresponding pixels in reference test image is greater than the predetermined value. Embodiment 11: The apparatus of any one of embodiments 1-10, further comprising a display, wherein the executable instructions, when executed by the processor, further configure the processor to, in response to determining a configuration change has occurred, display the notification on the display. Embodiment 12: The apparatus of any one of embodiments 1-10, wherein the executable instructions, when executed by the processor, further configure the processor to, in response to determining a configuration change has occurred, transmit notification information to the display device for displaying the notification on the display device.

Embodiment 13: The apparatus of any one of embodiments 1-12, wherein the quality threshold is a value that if exceeded, is indicative that the test image display data has a different contrast than the reference test image. Embodiment 14: The apparatus of any one of embodiments 1-13, wherein the quality threshold is a value that if exceeded, is indicative that the test image display data has a different brightness than the reference test image. Embodiment 15: The apparatus of any one of embodiments 1-14, wherein the quality threshold is a value that if exceeded, is indicative that the test image display data has a different dynamic range than the reference test image. Embodiment 16: The apparatus of any one of embodiments 1-15, wherein the quality threshold is a value that if exceeded, is indicative that the test image display data has one or more different image characteristics than the reference test image.

Embodiment 17: A non-transitory computer readable medium for determining quality of an image displayed on a display device, the computer readable medium having program instructions for causing a hardware processor to perform a method of: determining that a configuration change has occurred at the display device; providing a test image to the display device; receiving test image display data from the display device, the test image pixel data generated by a processor of the display device by processing the test image; determining if the test image display data is different than a reference test image by more than a quality threshold; and in response to determining that the test image display data is different than the reference test image by more than a quality threshold, generating an indicator that the configuration change affects functionality of the display device.

Embodiment 18: The computer readable medium of embodiment 17, wherein the reference test image is representative of the test image processed by the display device prior to the configuration change. Embodiment 19: The computer readable medium of embodiment 17, wherein the reference test image is representative of expected test image display data, of the test image, generated by the display device. Embodiment 20: The computer readable medium of any one of embodiments 17-19, wherein the method further comprises determining if the test image display data is different than a reference test image by more than a quality threshold by comparing corresponding pixel values in the test image display data and the reference test image. Embodiment 21: The computer readable medium of any one of embodiments 17-20, wherein the method further comprises determining if there is a change in communication signals between the apparatus and the display device, and if there is a change in the communication signals between the apparatus and the display device, generating a notification that the configuration change affects communications with the display device. Embodiment 22: The computer readable medium of any one of embodiments 17-21, wherein the method further comprises determining if there is a change in control codes that are used to initiate rendering images on the display device, and if there is a change in the control codes that are used to initiate rendering images on the display device, generate a notification that the configuration change affects the control codes. Embodiment 23: The computer readable medium of any one of embodiments 17-22, wherein the method further comprises determining if the test image display data is different than a reference test image by more than a quality threshold by determining the number of pixels in the test image display data that are different than the reference test image.

Embodiment 24: The computer readable medium of any one of embodiments 17-23, wherein the quality control threshold is a predetermined number of pixels, and wherein the method determines if the test image data is different than the reference image data by more than a quality threshold by determining if the number of pixels in the test image display data that are different than the corresponding pixels in the reference test image is greater than the predetermined number of pixels. Embodiment 25: The computer readable medium of any one of embodiments 17-24, wherein the quality control threshold is a predetermined percentage of pixels, and wherein the method determines if the test image data is different than the reference image data by more than a quality threshold by determining if the number of pixels in the test image display data that are different than the corresponding pixels in the reference test image is greater than the predetermined percentage of pixels. Embodiment 26: The computer readable medium of any one of embodiments 1725, wherein the quality control threshold is a predetermined value, and wherein the method determines if the test image data is different than the reference image data by more than a quality threshold by determining if the sum of the differences of values of the pixels in the test image display data and values of corresponding pixels in reference test image is greater than the predetermined value. Embodiment 27: The computer readable medium of any one of embodiments 17-26, wherein the method further comprises, in response to determining a configuration change has occurred, displaying the notification on a display of the apparatus. Embodiment 28: The computer readable medium of any one of embodiments 17-23, wherein the method further comprises, in response to determining a configuration change has occurred, displaying the notification on a display of the display device. Embodiment 29: The computer readable medium of embodiment 17, wherein the quality threshold is a value that if exceeded, is indicative that the test image display data has a different contrast than the reference test image.

Embodiment 30: The computer readable medium of any one of embodiments 17-29, wherein the quality threshold is a value that if exceeded, is indicative that the test image display data has a different brightness than the reference test image. Embodiment 31: The computer readable medium of any one of embodiments 17-30, wherein the quality threshold is a value that if exceeded, is indicative that the test image display data has a different dynamic range than the reference test image. Embodiment 32: The computer readable medium of any one of embodiments 17-30, wherein the quality threshold is a value that if exceeded, is indicative that the test image display data has one or more different image characteristics than the reference test image.

Embodiment 33: A method for determining quality of an image displayed on a display device, the method comprising: determining that a configuration change has occurred at the display device; providing a test image to the display device; receiving test image display data from the display device, the test image pixel data generated by a processor of the display device by processing the test image; determining if the test image display data is different than a reference test image by more than a quality threshold; and in response to determining that the test image display data is different than the reference test image by more than a quality threshold, generating an indicator that the configuration change affects functionality of the display device.

Embodiment 34: The method of embodiment 33, wherein the reference test image is representative of the test image processed by the display device prior to the configuration change. Embodiment 35: The method of embodiments 33, wherein the reference test image is representative of expected test image display data, of the test image, generated by the display device. Embodiment 36: The method of any one of embodiments 33-35, wherein the method further comprises determining if the test image display data is different than a reference test image by more than a quality threshold by comparing corresponding pixel values in the test image display data and the reference test image. Embodiment 37: The method of any one of embodiments 33-36, wherein the method further comprises determining if there is a change in communication signals between the apparatus and the display device, and if there is a change in the communication signals between the apparatus and the display device, generating a notification that the configuration change affects communications with the display device. Embodiment 38: The method of any one of embodiments 33-37, wherein the method further comprises determining if there is a change in control codes that are used to initiate rendering images on the display device, and if there is a change in the control codes that are used to initiate rendering images on the display device, generate a notification that the configuration change affects the control codes. Embodiment 39: The method of any one of embodiments 33-38, wherein the method further comprises determining if the test image display data is different than a reference test image by more than a quality threshold by determining the number of pixels in the test image display data that are different than the reference test image. Embodiment 40: The method of any one of embodiments 33-39, wherein the quality control threshold is a predetermined number of pixels, and wherein the method determines if the test image data is different than the reference image data by more than a quality threshold by determining if the number of pixels in the test image display data that are different than the corresponding pixels in the reference test image is greater than the predetermined number of pixels.

Embodiment 41: The method of any one of embodiments 33-40, wherein the quality control threshold is a predetermined percentage of pixels, and wherein the method determines if the test image data is different than the reference image data by more than a quality threshold by determining if the number of pixels in the test image display data that are different than the corresponding pixels in the reference test image is greater than the predetermined percentage of pixels.

Embodiment 42: The method of any one of embodiments 33-41, wherein the quality control threshold is a predetermined value, and wherein the method determines if the test image data is different than the reference image data by more than a quality threshold by determining if the sum of the differences of values of the pixels in the test image display data and values of corresponding pixels in reference test image is greater than the predetermined value. Embodiment 43: The method of any one of embodiments 33-42, the method further comprises, in response to determining a configuration change has occurred, displaying the notification on a display of the apparatus. Embodiment 44: The method of any one of embodiments 33-43, wherein the method further comprises, in response to determining a configuration change has occurred, displaying the notification on a display of the display device. Embodiment 45: The method of any one of embodiments 33-44, wherein the quality threshold is a value that if exceeded, is indicative that the test image display data has a different contrast than the reference test image. Embodiment 46: The method of any one of embodiments 33-46, wherein the quality threshold is a value that if exceeded, is indicative that the test image display data has a different brightness than the reference test image. Embodiment 47: The method of any one of embodiments 33-46, wherein the quality threshold is a value that if exceeded, is indicative that the test image display data has a different dynamic range than the reference test image. And embodiment 48: The method of any one of embodiments 33-48, wherein the quality threshold is a value that if exceeded, is indicative that the test image display data has one or more different image characteristics than the reference test image.

CONCLUSION

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the disclosure should not be taken to imply that the terminology is being re-defined herein to be restricted to including any specific characteristics of the features or aspects of the technology with which that terminology is associated.

It will be appreciated by those skilled in the art that various modifications and changes can be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures can be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations can be expressly set forth herein for sake of clarity.

Directional terms used herein (e.g., top, bottom, side, up, down, inward, outward, etc.) are generally used with reference to the orientation shown in the figures and are not intended to be limiting. For example, the top surface described above can refer to a bottom surface or a side surface. Thus, features described on the top surface may be included on a bottom surface, a side surface, or any other surface.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims can contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The term "comprising" as used herein is synonymous with "including," "containing," or "characterized by," and is inclusive or open-ended and does not exclude additional, unrecited elements or method steps.

The above description discloses several methods and systems of the present invention or inventions (both referred to as the "invention" for ease of reference). This invention is susceptible to modifications in the methods and systems, as well as alterations in the methods and systems. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention and as embodied in the attached claims.

What is claimed is:

1. An apparatus for determining quality of an image displayed on a display device, comprising:

a hardware memory configured to store executable instructions; and a hardware processor in communication with the hardware memory, wherein the executable instructions, when executed by the processor, configure the processor to:

determine that a configuration change has occurred at the display device;

provide a test image to the display device;

receive test image display data from the display device, the test image display data generated by a processor of the display device by processing the test image;

determine if the test image display data is different than a reference test image by more than a quality threshold;

in response to determining that the test image display data is different than the reference test image by more than a quality threshold, generate an indicator that the configuration change affects functionality of the display device; and in response to determining a configuration change has occurred, transmit notification information to the display device for displaying the notification on the display device.

2. The apparatus of claim 1, wherein the reference test image is representative of the test image processed by the display device prior to the configuration change.

3. The apparatus of claim 1, wherein the reference test image is representative of expected test image display data, of the test image, generated by the display device.

4. The apparatus of claim 1, wherein the processor is configured to determine if the test image display data is different than a reference test image by more than a quality threshold by comparing corresponding pixel values in the test image display data and the reference test image.

5. The apparatus of claim 1, wherein the executable instructions, when executed by the processor, further configure the processor to, in response to determining a configuration change has occurred:

determine if there is a change in communication signals between the apparatus and the display device, and if there is a change in the communication signals between the apparatus and the display device, generate a notification that the configuration change affects communications with the display device.

6. The apparatus of claim 1, wherein the executable instructions, when executed by the processor, further configure the processor to, in response to determining a configuration change has occurred:

determine if there is a change in control codes that are used to initiate rendering images on the display device; and if there is a change in the control codes that are used to initiate rendering images on the display device, generate a notification that the configuration change affects the control codes.

7. The apparatus of claim 1, wherein the processor is configured to determine if the test image display data is different than a reference test image by more than the quality threshold by determining the number of pixels in the test image display data that are different than the reference test image.

8. The apparatus of claim 1, wherein the quality control threshold is a predetermined number of pixels, and wherein the processor is configured to determine if the test image data is different than the reference image data by more than a quality threshold by determining if a number of pixels in the test image display data that are different than the corresponding pixels in the reference test image is greater than the predetermined number of pixels.

9. The apparatus of claim 1, wherein the quality control threshold is a predetermined percentage of pixels, and wherein the processor is configured to determine if the test image data is different than the reference image data by more than a quality threshold by determining if a number of pixels in the test image display data that are different than the corresponding pixels in the reference test image is greater than the predetermined percentage of pixels.

10. The apparatus of claim 1, wherein the quality control threshold is a predetermined value, and wherein the processor is configured to determine if the test image data is different than the reference image data by more than a quality threshold by determining if a sum of the differences of values of the pixels in the test image display data and values of corresponding pixels in reference test image is greater than the predetermined value.

11. The apparatus of claim 1, further comprising a display, wherein the executable instructions, when executed by the processor, further configure the processor to, in response to determining a configuration change has occurred, display the notification on the display.

12. The apparatus of claim 1, wherein the quality threshold is a value that if exceeded, is indicative that the test image display data has a different contrast than the reference test image.

13. The apparatus of claim 1, wherein the quality threshold is a value that if exceeded, is indicative that the test image display data has a different brightness than the reference test image.

14. The apparatus of claim 1, wherein the quality threshold is a value that if exceeded, is indicative that the test image display data has a different dynamic range than the reference test image.

15. The apparatus of claim 1, wherein the quality threshold is a value that if exceeded, is indicative that the test image display data has one or more different image characteristics than the reference test image.

16. A non-transitory computer readable medium for determining quality of an image displayed on a display device, the computer readable medium having program instructions for causing a hardware processor to perform a method of:

determining that a configuration change has occurred at the display device;

providing a test image to the display device;

receiving test image display data from the display device, the test image pixel data generated by a processor of the display device by processing the test image;

determining if the test image display data is different than a reference test image by more than a quality threshold, the reference test image being representative of the test image processed by the display device prior to the configuration change; and in response to determining that the test image display data is different than the reference test image by more than a quality threshold, generating an indicator that the configuration change affects functionality of the display device.

17. The computer readable medium of claim 16, wherein the reference test image is representative of expected test image display data, of the test image, generated by the display device.

18. A method for determining quality of an image displayed on a display device, the method comprising:

determining that a configuration change has occurred at the display device;

providing a test image to the display device;

receiving test image display data from the display device, the test image pixel data generated by a processor of the display device by processing the test image;

determining if the test image display data is different than a reference test image by more than a quality threshold, the reference test image being representative of the test image processed by the display device prior to the configuration change; and in response to determining that the test image display data is different than the reference test image by more than a quality threshold, generating an indicator that the configuration change affects functionality of the display device.

* * * * *